(12) United States Patent
Chatterjee et al.

(10) Patent No.: US 9,062,196 B2
(45) Date of Patent: *Jun. 23, 2015

(54) HIGH HEAT POLYCARBONATES, METHODS OF MAKING, AND ARTICLES FORMED THEREFROM

(75) Inventors: Gautam Chatterjee, Bangalore (IN); Gheorghe Cojocariu, Evansville, IN (US); Chandrashekhar Lingannaiah, Karnataka (IN); Gaurav Mediratta, Bangalore (IN); Shantaram Suryakant Morye, Maharashtra (IN); Gary Francis Smith, Lynchburg, VA (US); Veeraraghavan Srinivasan, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1454 days.

This patent is subject to a terminal disclaimer.

(21) Appl. No.: 11/864,176

(22) Filed: Sep. 28, 2007

(65) Prior Publication Data

US 2009/0088504 A1 Apr. 2, 2009

(51) Int. Cl.
  *C08L 69/00* (2006.01)
  *C08K 3/32* (2006.01)
  *C08K 5/42* (2006.01)
  *C08L 63/00* (2006.01)

(52) U.S. Cl.
  CPC ............ *C08L 69/00* (2013.01); *C08L 2205/02* (2013.01); *C08K 2003/329* (2013.01); *C08K 5/42* (2013.01); *C08L 63/00* (2013.01)

(58) Field of Classification Search
  None
  See application file for complete search history.

(56) References Cited

U.S. PATENT DOCUMENTS

| | | | |
|---|---|---|---|
| 5,344,910 A * | 9/1994 | Sybert | 528/201 |
| 5,387,629 A | 2/1995 | McGrath et al. | |
| 7,277,230 B2 | 10/2007 | Srinivasan et al. | |
| 7,491,788 B1 * | 2/2009 | Leenders et al. | 528/196 |
| 2005/0143532 A1 * | 6/2005 | Fonseca et al. | 525/439 |
| 2005/0194721 A1 * | 9/2005 | Bier et al. | 264/446 |
| 2005/0222334 A1 * | 10/2005 | Srinivasan et al. | 525/178 |
| 2005/0228137 A1 | 10/2005 | Srinivasan et al. | |
| 2005/0288517 A1 * | 12/2005 | Rai et al. | 548/472 |
| 2007/0010619 A1 | 1/2007 | Chatterjee et al. | |
| 2007/0123686 A1 | 5/2007 | Mahood et al. | |
| 2007/0123688 A1 * | 5/2007 | Mahood et al. | 528/196 |
| 2008/0119618 A1 * | 5/2008 | Agarwal et al. | 525/439 |

FOREIGN PATENT DOCUMENTS

| | | | |
|---|---|---|---|
| EP | 905178 | * | 3/1999 |
| WO | 2007136934 | | 11/2007 |

OTHER PUBLICATIONS

Villalobos, The Process of Recycling of Polyesters with Polymeric Chain Extenders; Johnson Polymer pp. 1-5; no date.*
International Search Report for International Application No. PCT/US2008/077367, mailed Jan. 22, 2009, 7 pages.
Written Opinion for International Search Report for International Application No. PCT/US2008/077367, mailed Jan. 22, 2009, 6 pages.
ASTM D 1003-00, Standard Test Method for Haze and Luminous Transmittance of Transparent Plastics, 6 pages.
ASTM D 1925-70, Standard Test Method for Yellowness Index of Plastics , 3 pages.

* cited by examiner

*Primary Examiner* — David Buttner
(74) *Attorney, Agent, or Firm* — Cantor Colburn LLP

(57) ABSTRACT

Disclosed herein is a polymer blend comprising a first polycarbonate comprising a first structural unit derived from a 2-aryl-3,3-bis(4-hydroxyaryl)phthalimidine and a second structural unit derived from a dihydroxy aromatic compound, wherein the second structural unit is not identical to the first structural unit, and a second polycarbonate comprising a structural unit derived from a dihydroxy aromatic compound, wherein the polymer blend has a glass transition temperature of 155 to 200° C.; and wherein a test auricle having a thickness of 3.2 mm and molded from the blend has a haze of less than or equal to 3.0 measured in accordance with ASTM D1003-00. A method of making the polymer blend, and articles prepared from the blend, are also disclosed.

13 Claims, 3 Drawing Sheets

US 9,062,196 B2

HIGH HEAT POLYCARBONATES, METHODS OF MAKING, AND ARTICLES FORMED THEREFROM

BACKGROUND OF THE INVENTION

This disclosure relates to polymer blends, and in particular to high heat polymer blends, methods of manufacture, and uses thereof.

Polycarbonate is a high-performance plastic with an excellent balance of toughness, strength, optical properties, and heat resistance. However, many new applications have high requirements on thermal properties. For example, applications such as commercial and automotive lighting and headlamp reflectors may require heat capability up to and above 200° C. as well as high transparency.

Some known high heat polycarbonate resins can provide higher glass transition temperatures. But issues with transparency, discoloring, toughness, impact strength, or stress crackling often prevented success.

There accordingly remains a need in the art for high heat polymer blends and articles made from them that are transparent.

SUMMARY OF THE INVENTION

The above-described and other deficiencies of the art are met by a polymer blend comprising a first polycarbonate comprising a first structural unit derived from a 2-aryl-3,3-bis(4-hydroxyaryl)phthalimidine and a second structural unit derived from a dihydroxy aromatic compound wherein the second structural unit is not identical to the first structural unit, and a second polycarbonate comprising a structural unit derived from a dihydroxy aromatic compound, wherein the polymer blend has a glass transition temperature of 155 to 200° C.; and wherein a test article having a thickness of 3.2 mm and molded from the blend has a haze of less than or equal to 2.6% measured in accordance with ASTM D1003-00.

In another embodiment, a method of making a polymer blend comprises blending a first polycarbonate comprising a first structural Unit derived from a 2-aryl-3,3-bis(4-hydroxyaryl)phthalimidine and a second structural unlit derived from a dihydroxy aromatic compound wherein the second structural unit is not identical to the first structural unit, with a second polycarbonate comprising a structural unit derived from a dihydroxy aromatic compound, to form a blending mixture; and extruding the blending mixture; wherein the polymer blend prepared by the method has a glass transition temperature of 155 to 200° C.; and wherein a test article having a thickness of 3.2 mm and molded from the polymer blend prepared by the method has a haze of less than or equal to 2.6% measured in accordance with ASTM D1003-00.

In another embodiment, a polymer blend comprises a first polycarbonate comprising structural units derived from 2-aryl-3,3-bis(4-hydroxyaryl)phthalimidine and bisphenol A, and a second polycarbonate comprising structural units derived from bisphenol A; wherein the polymer blend has a glass transition temperature of 155 to 200° C.; and wherein a test article having a thickness of 3.2 mm and molded from the polymer blend has a haze of less than or equal to 2.6% measured in accordance with ASTM D1003-00.

In yet another embodiment, a polymer blend comprises a first polycarbonate consisting essentially of structural units derived from 2-aryl-3,3-bis(4-hydroxyaryl)phthalimidine and bisphenol A, and a second polycarbonate consisting essentially of structural units derived from a dihydroxy aromatic compound; wherein the polymer blend has a glass transition temperature of 155 to 200° C.; and wherein a test article having a thickness of 3.2 mm and molded from the blend has a haze of less than or equal to 2.6% measured in accordance with ASTM D1003-00.

In still another embodiment, a polymer blend comprises 10 to 90 wt % of a first polycarbonate comprising structural units derived from 2-aryl-3,3-bis(4-hydroxyaryl)phthalimidine, and 90 to 10 wt % of a second polycarbonate comprising structural units derived from bisphenol A; wherein the weight percentages are based on the total weight of the first polycarbonate and the second polycarbonate; wherein the polymer blend has a glass transition temperature of 155 to 200° C.; and wherein a test article having a thickness of 3.2 mm and molded from the blend has a haze of less than or equal to 2.6% measured in accordance with ASTM D1003-00.

In another embodiment, a polymer blend comprises a first polycarbonate comprising a first structural unit derived from 2-aryl-3,3,-bis(4-hydroxyaryl)phthalimidine and a second structural unit derived from bisphenol-A, and a second polycarbonate comprising a third structural unlit derived from bisphenol-A, wherein the polymer blend has a glass transition temperature of 160° C. to 190° C., wherein a test article having a thickness of 3.2 mm and molded from the blend has a haze of less than or equal to 2.6% as measured in accordance with ASTM D1003-00.

In another embodiment, a polymer blend comprises a first polycarbonate comprising a first structural unit derived from 2-phenyl-3,3,-bis(4-hydroxyphenyl)phthalimidine and a second structural unit derived from bisphenol-A, and a second polycarbonate comprising a structural unit derived from bisphenol-A, wherein the polymer blend has a glass transition temperature of 160° C. to 190° C., wherein a test article having a thickness of 3.2 mm and molded from the blend has a haze of less than or equal to 2.6% as measured in accordance with ASTM D1003-00.

In another embodiment, a polymer blend comprises 10 to 90 wt % of a first polycarbonate consisting essentially of structural units derived from 2-aryl-3,3-bis(4-hydroxyaryl) phthalimidine and bisphenol A, and 90 to 10 wt % of a second polycarbonate comprising structural units derived from bisphenol A; wherein the weight percentages are based on the total weight of the first polycarbonate and the second polycarbonate; wherein the polymer blend has a glass transition temperature of 155 to 200° C.; and wherein a test article having a thickness of 3.2 mm and molded from the polymer blend has a haze of less than or equal to 2.6% measured in accordance with ASTM D1003-00.

In another embodiment, a thermoplastic composition comprising a polymer blend comprises a first polycarbonate comprising a first structural unit derived from a 2-aryl-3,3-bis(4-hydroxyaryl)phthalimidine and a second structural unit derived from a dihydroxy aromatic compound, and the second structural unit is not identical to the first structural unit, and a second polycarbonate comprising a structural unit derived from a dihydroxy aromatic compound; an acid additive, and an epoxy additive; wherein the polymer blend has a glass transition temperature of 155 to 200° C.; and wherein a test article having a thickness of 3.2 mm and molded from the blend has a haze of less than 2.6% measured in accordance with ASTM D1003-00.

In another embodiment, a transparent thermoplastic composition comprising a polymer blend comprises a polycarbonate comprising a first structural unit derived from a 2-aryl-3,3-bis(4-hydroxyaryl)phthalimidine and a second structural unit derived from a dihydroxy aromatic compound, and the second structural unit is not identical to the first structural unit; an acid additive, and an epoxy additive; wherein the polymer blend has a glass transition temperature of 155 to 200° C.

In another embodiment, a transparent thermoplastic composition comprising a polymer blend comprises: a first polycarbonate comprising a first structural unit derived from a 2-aryl-3,3-bis(4-hydroxyaryl)phthalimidine and a second structural unit derived from a dihydroxy aromatic compound, and the second structural unit is not identical to the first structural unit, and a second polycarbonate comprising a structural unit derived from a dihydroxy aromatic compound; an acid additive, and an epoxy additive; wherein the polymer blend has a glass transition temperature of 155 to 200° C.; and wherein a test article having a thickness of 3.2 mm and molded from the blend has a haze of less than 2.6% and a percent transmission of greater than 80%, when measured in accordance with ASTM D1003-00.

The above described and other features are exemplified by the following figures and detailed description.

Figure 1:
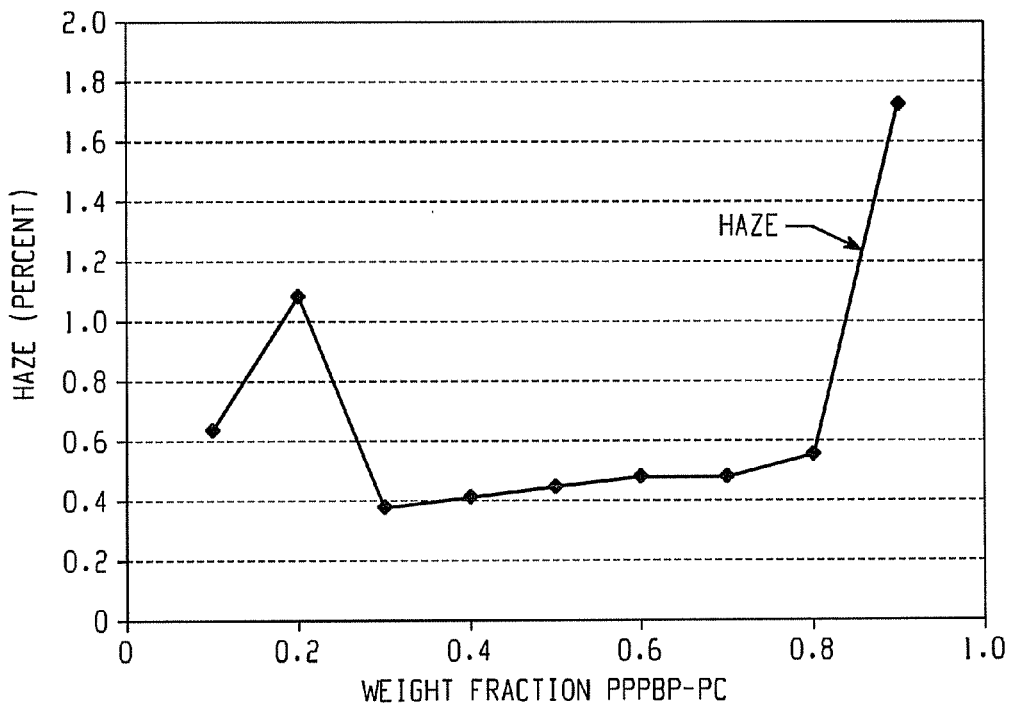
FIG. 1 is a plot of haze versus weight fraction for a blend of a lower Mw (Mw 23,100 g/mol) polycarbonate having 35 mol % structural units derived from 2-phenyl-3,3-bis(4-hydroxyphenyl)phthalimidine and a bisphenol A polycarbonate homopolymer (Mw 29,900 g/mol)

The above described and other features are exemplified by the following detailed description.

DETAILED DESCRIPTION OF THE INVENTION

Surprisingly, it has now been found that a polymer blend comprising a first polycarbonate comprising structural units derived from 2-aryl-3,3-bis(4-hydroxyaryl)phthalimidine and units derived from a dihydroxy aromatic compound, and a second polycarbonate comprising structural units derived from a dihydroxy aromatic compound has desirable glass transition temperature and low haze value. The polymer blend can be used in a wide variety of applications, including automotive headlamp lens.

Polycarbonates disclosed herein have repeating structural carbonate units of the formula (1):

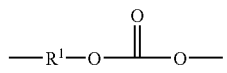

wherein at least 60 percent of the total number of $R^1$ groups contains aromatic organic groups and the balance thereof are aliphatic, alicyclic, or aromatic groups. "Polycarbonate" as used herein includes polymers homopolycarbonates and copolycarbonates (copolymers comprising different $R^1$ moieties in the polycarbonate).

In an embodiment, each $R^1$ group is a divalent aromatic group, derived from a dihydroxy aromatic compound of the formula (3):

$$HO-A^1-Y^1-A^2-OH \quad (3)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of dihydroxy aromatic compounds of formula (3) are bisphenol compounds of general formula (4):

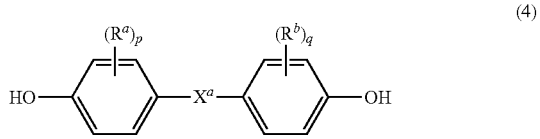

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5) or (6):

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In an embodiment, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (7):

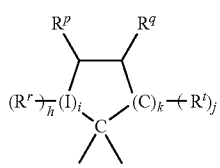

(7)

wherein each $R^r$, $R^p$, $R^q$, and $R^t$ is independently hydrogen, halogen, oxygen, or $C_{1-12}$ organic group; I is a direct bond, a carbon, a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (7) will have an unsaturated carbon-carbon linkage where the ring is fused. When k is 1 and i is 0, the ring as shown in formula (7) contains 4 carbon atoms, when k is 2, the ring as shown contains 5 carbon atoms, and when k is 3, the ring contains 6 carbon atoms. In one embodiment, two adjacent groups (for example, $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are provided, including for example bisphenols of formula (8):

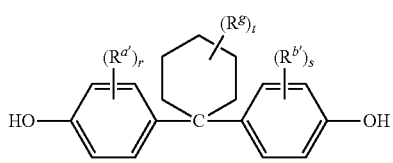

(8)

wherein $R^{a'}$ and $R^{b'}$ are each independently $C_{1-12}$ alkyl, $R^g$ is $C_{1-12}$ alkyl or halogen, r and s are each independently 0 to 4, and t is 0 to 10. It will be understood that hydrogen fills each valency when r is 0, s is 0, and t is 0. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Such cyclohexane-containing bisphenols, for example the reaction product of two moles of a phenol with one mole of a hydrogenated isophorone, are useful for making polycarbonate polymers with high glass transition temperatures and high heat distortion temperatures. In an embodiment, an exemplary cyclohexyl bisphenol containing polycarbonate is derived from two equivalents of phenol and an equivalent of an isophorone, such as 3,3,5-trimethylcyclohexanone, or a combination comprising at least one of the foregoing with other bisphenol polycarbonates. Such cyclohexyl-based bisphenols derived from isophorone are supplied by Bayer Co. under the APEC® trade name.

Other useful dihydroxy compounds have the formula (9):

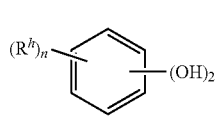

(9)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9 to bis (4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxanthin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinoines such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of dihydroxy aromatic compounds that can be represented by formula (3) include 2-aryl-3,3-bis(4-hydroxyaryl)phthalimidine, 1,1-bis(4-hydroxyphenyl) methane, 1,1-bis(4-hydroxyphenyl) ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, 3,3-bis(4-hydroxyphenyl)phthalimidine, and 1,1-bis(4-hydroxy-3-methylphenyl)cyclohexane (DMBPC). Combinations comprising at least one of the foregoing dihydroxy compounds can also be used.

The polymer blend disclosed herein comprises a first polycarbonate and a second polycarbonate. The first polycarbonate comprises structural units derived from a dihydroxy aromatic compound having the formula (10):

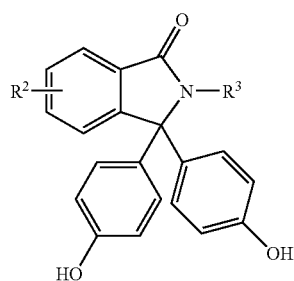

(10)

wherein $R^3$ is selected from a group consisting of a hydrogen and a hydrocarbyl group, and $R^2$ is selected from the group consisting of a hydrogen, a $C_{1-25}$ hydrocarbyl group, and a halogen.

As used herein, the term "hydrocarbyl" means a monovalent moiety formed by removing a hydrogen atom from a hydrocarbon. Representative hydrocarbyls include alkyl groups having 1 to 25 carbon atoms, such as methyl, ethyl, propyl, butyl, pentyl, hexyl, heptyl, octyl, nonyl, undecyl, decyl, dodecyl, octadecyl, nonadecyl, eicosyl, heneicosyl, docosyl, tricosyl, and the isomeric forms thereof; aryl groups having 6 to 25 carbon atoms, such as ring-substituted and ring-unsubstituted forms of phenyl, tolyl, xylyl, naphthyl, biphenyl, tetraphenyl, and the like; aralkyl groups having 7 to 25 carbon atoms, such as ring-substituted and ring-unsubstituted forms of benzyl, phenethyl, phenpropyl, phenbutyl, naphthoctyl, and the like; and cycloalkyl groups, such as cyclopropyl, cyclobutyl, cyclopentyl, cyclohexyl, cycloheptyl, cyclooctyl, and the like. The term "aryl" as used herein refers to various forms of aryl groups that have been described hereinabove for the "hydrocarbyl" group. The bisphenols of formula (10), when the hydrocarbyl group $R^3$ is an aryl group having 6 to 25 carbon atoms, is referred to herein as a 2-aryl-3,3-bis(4-hydroxyaryl)phthalimidine. The 2-aryl-3,3-bis(4-hydroxyaryl)phthalimidines are particularly useful as co-monomers for preparing the first polycarbonate.

In an embodiment, the first polycarbonate comprises a first structural unit derived from 2-aryl-3,3-bis(4-hydroxyaryl) phthalimidine and a second structural unit derived from a dihydroxy aromatic compound, where the second structural unit is not identical to the first structural unit. In another embodiment, the first polycarbonate consists essentially of a first structural unit derived from 2-aryl-3,3-bis(4-hydroxyaryl)phthalimidine and a second structural unit derived from a dihydroxy aromatic compound, where the second structural unit is not identical to the first structural unit. In an exemplary embodiment, the 2-aryl-3,3-bis(4-hydroxyaryl) phthalimidine of the first structural unit is 2-phenyl-3,3-bis (4-hydroxyphenyl)phthalimidine (para,para-PPPBP or "PPPBP"). In another exemplary embodiment, the dihydroxy aromatic compound of the second structural unit is bisphenol A (BPA). In another exemplary embodiment, the dihydroxy aromatic compounds of the second structural unit in the first polycarbonate, and the structural unit of the second polycarbonate are derived from bisphenol A. In another embodiment, the first polycarbonate is a linear copolymer.

In an embodiment, the first polycarbonate has 5 to 70 mole percent (mol %), specifically 5 to 60 mol %, more specifically 5 to 45 mol % of structural units derived from a 2-aryl-3,3-bis(4-hydroxyaryl)phthalimidine. In a specific embodiment, the first polycarbonate has 5 to 10 mol %, specifically 6 to 9 mol %, of structural units derived from a 2-aryl-3,3-bis(4-hydroxyaryl)phthalimidine. In another specific embodiment, the first polycarbonate has 10 to 45 mol %, specifically 25 to 45 mol %, and more specifically 25 to 35 mol %, of structural units derived from a 2-aryl-3,3-bis(4-hydroxyaryl)phthalimidine. It will be understood that where a mole percentage of structural units is specified for the first polycarbonate, the mole percentage is based on the total number of moles of the first and second structural units present in the first polycarbonate.

The 2-aryl-3,3-bis(4-hydroxyaryl)phthalimidines of formula (10) can generally be prepared by reaction of an aromatic amine (also referred to herein as "aryl amine"), for example, an aniline, of formula (11):

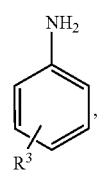

(11)

wherein $R^3$ is as defined above; with a phenolphthalein of formula (12):

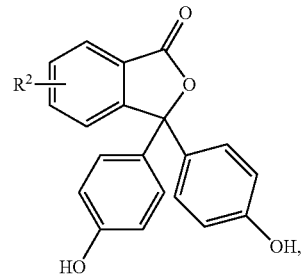

(12)

wherein $R^2$ is as previously defined. An acid catalyst is generally used to facilitate formation of the phthalimidine product. Suitable acid catalysts that can be used include amine salts of mineral acids including, for example, hydrochloric acid, sulfuric acid, or nitric acid, but are not limited thereto. Examples of suitable amines include primary, secondary, and tertiary amines having any combination of aliphatic and aromatic groups bonded to the amine nitrogen. Suitable exemplary amine salt catalysts include primary, secondary, and tertiary amine hydrochlorides. Hydrochloride salts of the primary aromatic amines of formula (11) are especially suitable since the amines of formula (11) also serve as the starting material for preparing the phthalimidines of formula (10).

In one embodiment, the catalyst is introduced as a preformed salt into the reactor. In another embodiment, the catalyst is generated in the reactor by first charging the amine of formula (11) into the reactor, and then adding about 1/3 to about 1 part by weight of an appropriate mineral acid to phenolphthalein. In still another embodiment, about 0.1 parts to about 0.3 parts by weight of hydrogen chloride gas is introduced into a reactor charged with the aryl amine to form an appropriate amount of the aryl amine hydrochloride catalyst. More hydrochloric acid or more hydrogen chloride gas can also used, but is generally not required. A solvent can optionally be employed to form the aryl amine hydrochloride. The solvent can then be removed (if necessary), and the aryl amine of formula (11) can be added, followed by addition of phenolphthalein (12). The reaction of phenolphthalein (12) with the aryl amine (11) proceeds by a condensation reaction to form the desired phtalimidine product (10). An excess of the aryl amine over the phenolphthalein may be used to keep the reaction proceeding in the forward direction. Likewise, a higher reaction temperature with or without removal of water by-product also facilitates product formation. It is desirable to enhance the selectivity of the reaction to produce 2-aryl-3,3-bis(4-hydroxyaryl)phthalimidine (10) in high purity, and suppress the formation of undesired 2-aryl-3-(4-hydroxyaryl)-3-(4-aminoxyaryl)phthalimidine by-products. Such by-products can have the structure of formula (13):

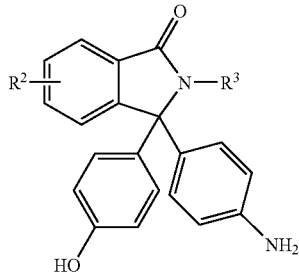

(13)

wherein $R^2$ and $R^3$ are as previously described. For example, where the 2-aryl-3-(4-hydroxyaryl)-3-(4-aminoxyaryl)phthalimidine is 2-phenyl-3,3-bis(4-hydroxyphenyl)phthalimidine, the by-product is 2-phenyl-3-(4-amino-phenyl)-3-(4-hydroxyphenyl)phthalimidine (or "a,p-PPPBP"). In an embodiment, to reduce the formation of by-products the temperature of the reaction mixture is controlled and the rate of removal of water as well. The temperature of the reaction mixture and rate of water removal is controlled such that the 2-aryl-3,3-bis(4-hydroxyaryl)phthalimidine product used as a co-monomer for preparing the first polycarbonate is, in an embodiment, at least 97.5 percent pure, specifically at least 98 percent pure, and more specifically at least 99 percent pure, where purity is generally measured as a percentage of the total response area of quantitative method such as liquid chromatography or gas chromatography. In an embodiment, the 2-aryl-3,3-bis(4-hydroxyaryl)phthalimidine is substantially free of impurity. As used herein, "substantially free" means that the amount of 2-aryl-3-(4-hydroxyaryl)-3-(4-aminoxyaryl)phthalimidine by-product present in the feed is less than or equal to 1,000 parts per million (ppm), specifically 500 ppm, more specifically 100 ppm, and still more specifically 50 ppm based on the total weight of the 2-aryl-3,3-bis(4-hydroxyaryl)phthalimidine product.

The second polycarbonate also comprises structural units of formula (3) that are derived from a dihydroxy aromatic compound. The dihydroxy aromatic compound from which the structural units in the second polycarbonate are derived can thus be the same as or different from the dihydroxy aromatic compound from which the second structural unit of the first polycarbonate is derived. It will be understood that, as disclosed herein, the dihydroxy aromatic compounds of the first and second polycarbonates are not identical to the 2-aryl-3,3-bis(4-hydroxyaryl)phthalimidine from which the first structural unit of the first polycarbonate is derived. In an embodiment, the dihydroxy aromatic compounds of the first and second polycarbonates are the same or different. In another embodiment, the second polycarbonate consists essentially of a structural unit derived from a dihydroxy aromatic compound where the dihydroxy aromatic compounds of the first and second polycarbonates are the same or different. In an embodiment, the dihydroxy aromatic compound in the second polycarbonate is bisphenol A (BPA). In an embodiment, the second polycarbonate is a linear polymer.

The first and the second polycarbonates can be manufactured by processes such as interfacial polymerization and melt polymerization. Although reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, for example, 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (for example, the bischloroformates of bisphenol A, hydroquinone, or the like) or a glycol (for example, the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-8}$ aryloxy group.

An effective amount of a phase transfer catalyst can be 0.1 to 10 wt % based on the weight of the dihydroxy compound in the polymerization reaction mixture. In one embodiment, the reaction is a phosgenation reaction. In another embodiment, the effective amount of phase transfer catalyst is 0.5 to 2 wt % based on the weight of the dihydroxy compound in the reaction mixture.

Alternatively, melt processes can be used to make the first and the second polycarbonates. Generally, in a melt polymerization process, a polycarbonate can be prepared by co-reacting, in a molten state, a dihydroxy compound and a diaryl carbonate ester, such as diphenyl carbonate, in the presence of a transesterification catalyst in a BANBURY® mixer, single screw extruder, twin screw extruder, or the like to form a uniform dispersion. Volatile monohydric phenol is removed from the molten reactants by distillation and the polycarbonate polymer is isolated as a molten residue. A specifically useful melt process for making polycarbonates uses a diaryl carbonate ester having electron-withdrawing substituents on the aryls. Examples of specifically useful diaryl carbonate esters with election withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

Useful transesterification catalysts for use in melt polymerization process can include phase transfer catalysts of formula $(R^3)_4Q^+X$ described above, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %, based on the total weight of the polymer blend. Mixtures comprising linear polycarbonates and branched polycarbonates can be used.

The first polycarbonate and the second polycarbonate can have a weight averaged molecular weight (Mw) of greater than or equal to 5,000 g/mol. The first and second polycarbonates can also have a Mw of less than or equal to 100,000 g/mol where Mw is as measured by gel permeation chromatography (GPC), using a crosslinked styrene-divinylbenzene column and calibrated to polycarbonate or polystyrene references. GPC samples are prepared at a concentration of about 1 mg/ml, and are eluted at a flow rate of about 1.5 ml/min. In one embodiment, the first polycarbonate has a Mw of less than or equal to 35,000 g/mol, specifically less than or equal to 32,000 g/mol, more specifically less than 1 or equal to 30,000 g/mol, and still more specifically less than or equal to 29,000 g/mol. Also in an embodiment, the first polycarbonate has a Mw of greater than or equal to 20,000 g/mol, specifically greater than or equal to 22,000 g/mol, more specifically greater than or equal to 25,000 g/mol, and still more specifically greater than or equal to 26,000 g/mol. In another embodiment, the second polycarbonate has a Mw of less than or equal to 35,000 g/mol, specifically less than or equal to 30,000 g/mol, more specifically less than or equal to 29,000 g/mol, or still more specifically less than or equal to 25,000 g/mol. Also in an embodiment, the second polycarbonate has a Mw of greater than or equal to 12,000 g/mol, specifically greater than or equal to 15,000 g/mol, more specifically greater than 1 or equal to 18,000 g/mol, and still more specifically greater than or equal to 20,000 g/mol. It will be understood that the high and low Mw endpoints for the first polycarbonate, and the high and low Mw endpoints for the second polycarbonate, are independently combinable to provide a range for the first and second polycarbonates respectively, inclusive of the endpoints. The first polycarbonate and the second polycarbonate can be melt blended to form a polymer blend which is valuable for producing articles having excellent transparency or desirable heat stability. Additionally, the polymer blend can comprise one or more suitable additives in addition to the first and the second polycarbonates, with the proviso that the additives are selected so as to not significantly adversely affect the desired properties such as transparency and/or heat stability of the polymer blend. Such additives can be mixed at a suitable time during the mixing of the components for forming the polymer blend.

It has been found that addition of acid stabilizers to polycarbonate-based thermoplastic compositions comprising carbonate units based on 2-aryl-3,3,-bis(4-hydroxyaryl)phthalimidine, such as phosphorous acid or p-toluenesulfonic acid improves the color stability on molding of such resins, particularly at temperatures greater than about 325° C. However, the inclusion of such acids results in higher color shift (measurable as the increase in yellowness index per unit time, such as per day) during long-term heat aging (i.e., heating at greater than or equal to 150° C., where the aging can be measured for a period of time suitable to obtain a clear linear relationship, such as for example for at least 2 weeks). Including such additives can also reduce the hydrolytic stability (i.e., increases the amount of hydrolysis) of such polycarbonate-based compositions as measured by the amount of reduction in weight averaged molecular weight (Mw) on exposure to combined heat and moisture conditions of, for example, 80° C. and 80% relative humidity (80/80 conditions) or 90° C. and 95% relative humidity (90/95 conditions) for time periods of greater than or equal to 1 week. Inclusion of such additives has been found to reduce the Mw by about 12% or more under the milder 80/80 conditions, and 36% or more under the 90/95 conditions.

Surprisingly, it has further been found that including a combination of a hydrolysis stabilizer having epoxy functional groups (sometimes referred to herein as an epoxy additive), and an acid additive with a polycarbonate comprising carbonate units based on 2-aryl-3,3,-bis(4-hydroxyaryl)phthalimidine, a blend of such a 2-aryl-3,3,-bis(4-hydroxyaryl) phthalimidine-based polycarbonate with another polycarbonate that is not identical, or with the thermoplastic composition comprising the blend, simultaneously improves yellowness index, melt processing, and molecular weight stability, while either the acid additive or epoxy additive alone do not achieve the desired balance of these properties. In particular, the combination of these additives in the polycarbonate, polycarbonate blend, or thermoplastic composition comprising these can reduce the overall reduction in Mw as measured for the polycarbonate component(s) measured from powder to molded part in samples that contain only acid stabilizers, or only epoxy additives. The addition of epoxy in combination with the acid reduces the color shift, defined herein as the change in yellowness index (YI) per day (dYI/day) during long-term heat aging versus the samples that contained only acid. The addition of the epoxy does not diminish the improvement in color stability on molding that was brought by the acid addition. The use of the combination of epoxy additive and acid additive also provides an improvement in melt stability for the above polycarbonate copolymer, blend of polycarbonates, or thermoplastic composition. Specifically, in an embodiment, a single glass transition temperature of less than or equal to 225° C., specifically less than or equal to 215° C., can also desirably be obtained for a blend of polycarbonates each comprising carbonate units derived from 2-aryl-3,3,-bis(4-hydroxyaryl)phthalimidine, when in combination with the epoxy additive and the acid additive. Specifically, the polycarbonates in such a blend can each have the same monomer set, but in different proportions.

Any Arrhenius acid (i.e., protic acid) can be used so long as the type and amount selected is such that molding properties are improved, and color and polycarbonate degradation are minimized. Any acid with a pKa of less than or equal to about 5 (measured in water) can be used. Use of a stronger acid, i.e., an acid having a pKa (measured in water) of less or equal to about 2, specifically about 2 to about −1, over a weaker acid, i.e., having a pKa (measured in water) of greater than about 2, specifically greater than about 2 to about 4.5, has a stronger effect on both molding and heat aging. Lower amounts of the stronger acid can therefore be used relative to the weaker acid, for the same color stabilization effect. In one embodiment, a stronger acid having a pKa of less than 2 is used; in other embodiments, a weaker acid having a pKa of greater than 2 is used. In some embodiments, an acid having a pKa of less than 4.5 is used.

Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy modified acrylates such as JONCRYL® ADR-4300 and JONCRYL® ADR-4368, available from Johnson Polymer Inc, Sturtevant, Wis. Epoxy additives can be used in amounts of up to 1 wt %, specifically 0.001 to 1 wt %, more specifically 0.001 to 0.5 wt %, based on the total weight of the polymer blend. In an embodiment, the epoxy additive can be included in an amount of 0.001 to 0.3 wt %, specifically 0.01 to 0.3 wt %, and more specifically 0.1 to 0.3 wt %, based on the total weight of the polymer blend. Use of greater amounts (greater than 1.0 wt % under mild-molding conditions, i.e., at temperatures of less than or equal to about 300° C.; and 0.3 wt % under more aggressive molding conditions, i.e., greater than or equal to about 300° C.) of epoxy compound will cause more splay, i.e., mold lines which fan outward from the point of injection into the mold, and observable to the unaided eye in molded articles comprising the thermoplastic composition.

Acid stabilizers can include, in an embodiment, phosphoric acid, phosphorous acid, $C_{6-30}$ aryl, $C_{7-30}$ aralkyl or $C_{1-30}$ phosphonic acids, sulfurous acids, $C_{6-30}$ aryl, $C_{7-30}$ aralkyl or $C_{1-30}$ alkyl sulfonic acids, ammonium salts of sulfuric acids, halogenated carboxylic acids such as, for example, trifluoroacetic acid, trichloroacetic acid, and the like. In an exemplary embodiment, a useful weaker acid is phosphorous acid, and a useful stronger acid is p-toluenesulfonic acid.

In an embodiment, where a weaker acid is used, the weaker acid can be used in an amount of up to 50 ppm, specifically 0.001 to 50 ppm, more specifically 0.01 to 40 ppm, more specifically 0.1 to 40 ppm, and still more specifically 1 to 30 ppm, by weight based on the total weight of the polymer blend. Use of greater amounts of weaker acid does not improve molding but can significantly adversely affect heat aging of the thermoplastic composition.

In an embodiment, where a stronger acid is used, the stronger acid can be used in an amount of up to 50 ppm, specifically 0.001 to 50 ppm, more specifically 0.01 to 40 ppm, more specifically 0.1 to 30 ppm, more specifically 0.1 to 20 ppm, and still more specifically 1 to 15 ppm, by weight based on the total weight of the polymer blend. Use of greater amounts of stronger acid does not improve molding but can significantly adversely affect heat aging of the thermoplastic composition.

The thermoplastic composition comprising a polycarbonate comprising carbonate units derived from 2-aryl-3,3,-bis (4-hydroxyaryl)phthalimidine, the epoxy additive, and the acid additive, has improved hydrolytic stability (i.e., exhibits a decrease in the amount of hydrolysis) over a comparative identical thermoplastic composition but comprising the acid additive alone, which is measurable by determining the difference in Mw for the blended polymers of the thermoplastic composition before and after exposure to heat and moisture, according to the equation 1:

$$\% \text{ Mw loss (for hydrostability)} = [[\text{Mw(after exposure)} - \text{Mw(before exposure)}]/\text{Mw(before exposure)}] \times 100 \qquad \text{(eq. 1)}$$

wherein the change (referred to herein interchangeably as both reduction and loss) in molecular weight is calculated by the difference, expressed as a percentage, of Mw after exposure to temperature and humidity test conditions compared to Mw before exposure to temperature and humidity. In an embodiment, a molded article comprising the thermoplastic composition exhibits a reduction in weight averaged molecular weight (Mw) for the component polycarbonates of less than or equal to 12%, specifically less than or equal to 10%, and still more specifically less than or equal to 8.5%, oil exposure to combined heat and moisture conditions of 80° C. and 80% relative humidity (referred to as 80/80 conditions) for about 1 week. In another embodiment, a molded article comprising the thermoplastic composition exhibits a reduction in weight averaged molecular weight (Mw) for the component polycarbonates of less than to 36%, specifically less than or equal to 30%, more specifically less than or equal to 25%, and still more specifically less than or equal to 24%, on exposure to combined heat and moisture conditions of 90° C. and 95% relative humidity (90/95 conditions) for greater about 1 week.

The increase in yellowness of a thermoplastic composition after heat aging may be determined by measuring the yellowness index (YI) of a molded article prepared from the thermoplastic composition, and comparing to the YI of the article before exposure. The YI of the thermoplastic composition can be measured using transmittance and/or reflective spectroscopic methods depending upon the combination of transparency, color, and surface finish appearance of the article molded from the thermoplastic composition. Where a molded article prepared from the thermoplastic composition is either transparent or translucent; is colorless, white, or off-white; and is glossy, semi-glossy, or non-glossy, the YI of the molded article may be determined according to ASTM D1925-70.

Where the molded article is opaque; is off-white or non-white; and has a glossy surface finish, the YI may be determined using reflectance measurement according to ASTM E313-73. The thermoplastic composition from which the article for testing is molded can contain additives typically included with polycarbonates, such as mold release agents and antioxidants. Typically the total amount of these additives is less than or equal to 1.0 percent by weight of the total weight of components present in thermoplastic composition. Additives such as mold release agents, stabilizers, and antioxidant may be used without affecting the properties tested for in the thermoplastic composition.

Thus, in an embodiment, a molded article having a thickness of 3.2 millimeters and consisting of the polymer blend, acid additive, and epoxy additive has a yellowness index (YI) of less than or equal to 10, specifically less than or equal to 7, more specifically less than or equal to 5 measured according to either ASTM D1925-70 or E313-73.

The increase in YI (dYI), also referred to as color shift, is calculated by subtracting the yellowness index value of a non-heat aged sample from that of a heat aged sample of the same composition. In an embodiment, a molded article having a thickness of 3.2 mm and prepared from the polymer blend, acid additive, and epoxy additive has, after heat aging and when measured according to ASTM D1925-70, an increase in yellowness index (dYI) per day of less than or equal to 0.5, specifically less than or equal to 0.45, more specifically less than or equal to 0.43, and still more specifically less than or equal to 0.4, when compared to an identical but non-heat treated molded article.

The color capability and stability of the thermoplastic composition can be determined spectrophotometrically against a standard composition comprising the same color composition in the same concentration, and classified according to the CIELAB color measurement method detailed by CIE (Commission Internationale de l'Eclairage). The values of E, L, a and b, used to describe the color space of a test material, are related by the equation (2):

$$\Delta E_{ab} = [(\Delta L)^2 + (\Delta a)^2 + (\Delta b)^2]^{0.5}. \quad \text{(eq. 2)}$$

In this equation, L represents the difference between light (L=100) and dark (L=0). The value a represents the difference between green (−a) and red (+a), and b represents the difference between yellow (+b) and blue (−b). The value of each parameter represents the magnitude of the difference in color. The net deviation for color capability is given by the overall deviation value E, which is the Euclidean distance between two points in a three dimensional space. Thus, the separation between points a and b, and the net deviation from the standard color, is given by the overall deviation value $\Delta E_{ab}$.

The polymer blend can comprise an antistatic agent to improve or adjust the antistatic properties of the blend, provided that the inclusion of the antistatic agent does not significantly adversely affect other desired properties of the polymer blend. As used herein, the term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents, where used, can be present in amounts of 0.0001 to 1 wt %, based on 100 wt % of the polymer blend.

The polymer blend can comprise a flame retardant. Useful flame retardant additives include, for example, flame retardant salts such as alkali metal salts of perfluorinated $C_{1-16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS are particularly useful in the polymer blends disclosed herein.

Useful flame retardant additives also include organic compounds that include phosphorus, bromine, and/or chlorine. Non-brominated and non-chlorinated phosphorus-containing flame retardants can be used in certain applications for regulatory reasons, for example organic phosphates and organic compounds containing phosphorus-nitrogen bonds. One type of exemplary organic phosphate is an aromatic phosphate of the formula $(GO)_3P=O$, wherein each G is independently an alkyl, cycloalkyl, aryl, alkylanyl, or arylalkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl)phosphate, phenyl bis(neopentyl)phosphate, phenyl bis(3,5,5'-trimethylhexyl) phosphate, ethyl diphenyl phosphate, 2-ethylhexyl di(p-tolyl) phosphate, bis(2-ethylhexyl)p-tolyl phosphate, tritolyl phosphate, bis(2-ethylhexyl)phenyl phosphate, tri(nonylphenyl) phosphate, bis(dodecyl)p-tolyl phosphate, dibutyl phenyl phosphate, 2-chloroethyl diphenyl phosphate, p-tolyl bis(2, 5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or poly-functional aromatic phosphorus-containing compounds are also useful, for example, compounds of the formulas below:

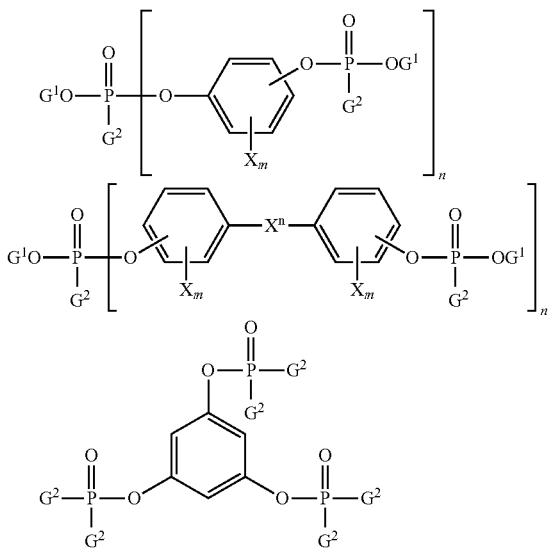

wherein each $G^1$ is independently a hydrocarbon having 1 to 30 carbon atoms; each $G^2$ is independently a hydrocarbon or hydrocarbonoxy having 1 to 30 carbon atoms; each X is independently a bromine or chlorine; m is 0 to 4, and n is 1 to 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol A, respectively, their oligomeric and polymeric counterparts, and the like.

Exemplary flame retardant additives containing phosphorus-nitrogen bonds include phosphonitrilic chloride, phosphorus ester amides, phosphoric acid amides, phosphonic acid amides, phosphinic acid amides, tris(aziridinyl)phospline oxide.

Where used, the foregoing flame retardant additives can be present in amounts of 0.01 to 10 wt %, more specifically 0.02 to 5 wt %, or even more specifically 0.02 to 1 wt %, based on the total weight the polymer blend.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments can be used in amounts of about 0.001 to about 3 wt % based on the total weight of the polymer blend.

Exemplary dyes are generally organic materials and can include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phtalocyanine dyes; oxazine dyes; carbostyryl dyes; napthalenetetracarboxylic acid dyes; porphyrin dyes; bis(styryl)biphenyl dyes; acridine dyes; antaraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes can be used in amounts of about 0.0001 to about 5 wt %, based on the total weight of the polymer blend.

The thermoplastic composition can contain additives typically included with polycarbonates, wherein the presence of these additives in an amount effective to perform the intended function does not significantly adversely affect the desired properties of the thermoplastic composition. The polymer blend may include fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; nonwoven fibrous reinforcements such as continuous strand mat, chopped strand mat, tissues, papers and felts or the like; or three-dimensional reinforcements such as braids. Fillers, where included, can be used in amounts of up to 10 wt %, more specifically, 0.1 to 5 wt %, based on the total weight of the polymer blend.

The polymer blend can include antioxidant additives (antioxidants). Exemplary antioxidant additives include, for example, organophosphites such as tris(nonyl phenyl)phosphite, tris(2,4-di-t-butylphenyl)phosphite ("IRGAFOS® 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnanate)]methane ("IRGANOX® 1076"), or the like; butylated reaction products of para-cresol or dicyclopentadiene; alkylated hydroquinones; hydroxylated thiodiphenyl ethers; alkylidenebisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 wt %, more specifically, 0.01 to 0.5 wt %, based on the total weight of the polymer blend.

The polymer blend can also include heat stabilizers. Exemplary heat stabilizer additives include, for example, organophosphites such as triphenyl phosphite, tris-(2,6-dimethylphenyl)phosphite, tris-(mixed mono- and di-nonylphenyl) phosphite or the like; phosphonates such as dimethylbenzene phosphonate or the like, phosphates such as trimethyl phosphate, or the like, or combinations comprising at least one of the foregoing heat stabilizers. Heat stabilizers can be used in amounts of 0.0001 to 1 wt %, based on the total weight of the polymer blend.

Light stabilizers and/or ultraviolet light (UV) absorbers can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.0001 to 1 wt %, more specifically, 0.01 to 0.5 wt %, based on the total weight of the polymer blend.

Exemplary UV absorbers include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® "UV 5411"); 2-(2H-benzotriazol-2-yl)-4-(tert-butyl)-6-(sec-butyl)phenol ("TINUVIN® 350"), 2-hydroxy-4-n-octoxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 manometers; or the like, or combinations comprising at least one of the foregoing UV absorbers. UV absorbers can be used in amounts of 0.0001 to 1 wt %, more specifically, 0.01 to 0.5 wt %, based on the total weight of the polymer blend.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials can be used in amounts of 0.001 to 1 wt %, more specifically 0.01 to 0.5 wt %, based on the total weight of the polymer blend.

Anti-drip agents can also be used in the polymer blend, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents can be used in amounts of 0.1 to 5 wt %, based on the total weight of the polymer blend.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalklene polyols such as 1,2-cyclopentanediol, 1,2-cyclohexanediol, and the like; branched alkylenepolyols such as 2,3-dimethyl-2,3-butanediol(pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group ($-CH_2OH$) or it can be a member of a more complex hydrocarbon group such as $-CR^4HOH$ or $-CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt %, based on the total weight of the polymer blend.

Polymer blends disclosed herein can be manufactured by various methods. For example, the first polycarbonate, the second polycarbonate, and other optional components are first blended in a HENSCHEL-Mixer® high speed mixer to form a blending mixture. Other low shear processes, including but not limited to hand mixing, can also accomplish this blending. The blending mixture is then fed into the throat of a single or twin screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

Extrusion conditions, for example twin screw vs. single screw extruder, can have an effect on the properties of the blends. In addition, the molecular weights of the first and/or the second polycarbonates can also have an impact on the properties of the blends.

The first polycarbonate and the second polycarbonate can be melt blended at different weight ratios to form a polymer blend having desirable properties such as excellent transparency and high heat stability. In particular, 10 to 90 wt %, or more specifically 50 to 90 wt %, or even more specifically 70 to 90 wt % of the first polycarbonate can be melt blended with 90 to 10 wt %, more specifically 50 to 10 wt %, or even more specifically 30 to 10 wt % of the second polycarbonate, respectively, wherein the weight percentages of each of the first and the second polycarbonates are based on the total weight of the first polycarbonate and the second polycarbonate.

In an embodiment, 70 to 90 wt % of the first polycarbonate is melt blended with 10 to 30 wt % of the second polycarbonate, wherein the first polycarbonate has 25 to 45 mol % of structural Lulits derived from 2-aryl-3,3-bis(4-hydroxyaryl) phthalimidine based on the total moles of structural units in the first polycarbonate, and wherein the first polycarbonate has a MW of less than 29,000 g/mol. In a specific embodiment, the first polycarbonate has 25 to 35 mol % of structural units derived from 2-aryl-3,3-bis(4-hydroxyaryl)phthalimidine as defined above.

In another embodiment, 10 to 90 wt % of the first polycarbonate is melt blended with 90 to 10 wt % of the second polycarbonate, wherein the first polycarbonate has 25 to 45 mol % of structural units derived fiom 2-aryl-3,3-bis(4-hydroxyaryl)phthalimidine based on the total moles of structural units in the first polycarbonate, and wherein the first polycarbonate has a Mw of less than 25,000 g/mol.

In another embodiment, a transparent thermoplastic composition comprising a polymer blend comprises a polycarbonate comprising a first structural unit derived from a 2-aryl-3,3-bis(4-hydroxyaryl)phthalimidine and a second structural unit derived from a dihydroxy aromatic compound, and the second structural unit is not identical to the first structural unit; an acid additive, and an epoxy additive; wherein the polymer blend has a glass transition temperature of 155 to 200° C. In another embodiment, the thermoplastic composition also comprises a second polycarbonate not identical to the first, where the second polycarbonate can have the same monomer set but in different proportions of monomer, or where the second polycarbonate call be a different polymer, i.e., can be a homopolymer such as bisphenol A homopolycarbonates.

The copolycarbonate (i.e., the first polycarbonate as described above), or polycarbonate polymer blends (e.g., the blends of first and second polycarbonates described above) can have desirable properties. For example, the polymer blend can have a single high glass transition temperature (Tg). The presence of a single Tg, indicates random distribution of different monomers in a copolycarbonate, and also miscibility of the component polymers, e.g., the first and the second polycarbonates, in the blend, whereas two or more glass transition temperatures can result in block formation in the copolycarbonate, or an immiscible blend of two or more component polycarbonate polymers. A high single Tg indicates high heat stability of the copolycarbonate or miscible blend. In an embodiment, the copolycarbonate or polycarbonate blends have a single glass transition temperature of greater than or equal to 155° C., specifically greater than or equal to 160° C., more specifically greater than or equal to 165° C., and still more specifically greater than or equal to 170° C. Also in an embodiment, the polycarbonate or polycarbonate blends, including those in the thermoplastic composition, can have a single glass transition of less than or equal to about 225° C., specifically less than or equal to about 220° C., more specifically less than or equal to about 215° C., more specifically less than or equal to 213° C., more specifically less than or equal to 200° C., more specifically less than or equal to 195° C., still more specifically less than or equal to 190° C., and still yet more specifically less than or equal to 187° C., provided the component polymers in the polymer blend do not exhibit any significant decomposition at these temperatures such that the other desirable properties of the polymer blend are significantly adversely affected. In an embodiment, a blend of polycarbonates each comprising structural emits (e.g., a carbonate unit) derived from a 2-aryl-3,3-bis(4-hydroxyaryl)phthalimidine has a Tg of less than or equal to about 225° C. It will be understood that the highest and lowest Tg endpoints hereinabove are independently combinable to form a range inclusive of the endpoints. Polymer blends having such desirable properties can exhibit a shear-thinning behavior during melt processing. That is, the polymer blends have the ability to flow under an applied shear. Therefore, standard melt processing equipment used for BPA polycarbonates can advantageously be used for producing articles.

The polymer blend can have excellent transparency. The polymer blends have low haze, which indicates the miscibility of the first and the second polycarbonates in the blend. The presence of edge haze on a molded part is an excellent way of detecting more subtle immiscibility of the two component polycarbonate polymers in the polymer blends. The appearance of parts can be significantly affected by edge haze. Thus, in an embodiment, a test article having a thickness of 3.2 mm and molded from the polymer blend has a haze of less than or equal to 2.6%, more specifically less than or equal to 2.5%, still more specifically less than or equal to 2.0% as measured in accordance with ASTM D1003-00. In a specific embodiment, the polymer blend has a haze of less than or equal to 1.0%, and still more specifically less than or equal to 0.5%, as measured in accordance with ASTM D1003-00. In another embodiment, a test article molded from the polymer blend is free of edge haze, as determined by viewing with the unaided eye from a viewing distance of 0.1 to 0.5 meters under natural light.

In an embodiment, a test article having a thickness of 3.2 millimeters (mm) and molded from the polymer blend can have a percent light transmission (% T) of greater than or equal to 80%, specifically greater than or equal to about 85%, and more specifically greater than or equal to 87%, as measured according to ASTM D1003-00.

Alternatively, or in addition, the polymer blends can have low yellowness index (YI). In some embodiments, a test article having a thickness of 3.2 mm and molded for the polymer blends have a yellowness index of less than 10, more specifically less than or equal to 6, and more specifically less than or equal to 2, as measured in accordance with ASTM D1925-70. Hence, these polymer blends are useful for producing articles having a number of useful properties, including a low residual color.

In addition, the polymer blends can have low loss of molecular weight during extrusion. Molecular weight loss, specifically weight averaged molecular weight, lost during extrusion at high temperature, for example at 270 to 380° C., is a good indication of high heat stability. The lower the molecular weight loss, the more stable the polymer blend at high temperature. Such loss in weight averaged molecular weight is summarized as a percentage loss in Mw by the equation (3):

$$[1-[[Mw(pre)-Mw(post)]/Mw(pre)]]\times 100 = \text{percent loss in Mw} \quad \text{(eq. 3)}$$

where Mw(pre) is the Mw before (pre) extrusion, and Mw(post) is the Mw after (post) extrusion. In an embodiment, the loss in weight average molecular weight (Mw) for the polymer blend, expressed as a percentage of the polymer blend measured before extrusion and after extrusion is less than or equal to 3%, specifically less than or equal to 2%, more specifically less than or equal to 1%, and still more specifically less than or equal to 0.9%, based on the Mw of the polymer blend before extrusion.

Shaped, formed, or molded articles comprising the polymer blends are also provided. The polymer blends can be molded into useful shaped articles by a variety of means such as injection molding, extrusion, rotational molding, blow molding and thermoforming to form articles such as, for example, an automotive headlamp inner lens, an automotive headlamp outer lens, an automotive fog lamp lens, an automotive bezel, a medical device, a display device, electrical connectors, under the hood automotive parts, a lens for streetlamp lighting, and projector lens. Examples of suitable display devices include a laptop computer screen, a liquid crystal display screen, and an organic light-emitting diode display screen.

The invention is further illustrated by the following non-limiting examples.

EXAMPLES

In the following examples, molecular weights were measured by gel permeation chromatography (GPC) using crosslinked styrene-divinylbenzene column, at a sample concentration of about 1 mg/ml, and eluted using methylene chloride or toluene. Unless otherwise noted, all molecular weights described herein are weight average molecular weights (Mw) calibrated to polycarbonate standards. The difference in weight averaged molecular weight is determined from a comparison of the weight averaged molecular weights of a sample and control. Heat stability was measured by the difference in weight averaged molecular weight (Mw) before extrusion (i.e., "powder"), after extrusion (i.e., "pellet"), and after molding (i.e., "part"), and expressed as percent loss in Mw as calculated according to equation (1), where Mw is determined using GPC as described hereinabove. Where done, the percent changes in molecular weight (Mw) are expressed as powder to pellet, pellet to part, and powder to part.

Glass transition temperatures of the polymer blends were measured by differential scanning calorimetry (DSC) by heating the polycarbonates at a scan rate of 10° C. to 20° C. per minute under nitrogen. Haze values for the polymer blends were measured on 3.2 mm molded plaques in accordance with ASTM D1003-00. Edge haze was determined by viewing a test article molded from the polymer blend, using the unaided eye from a viewing distance of 0.1 to 0.5 meters under natural light conditions. Yellowness Index (YI) for laboratory scale samples was determined using a HunterLab Color System at an illuminant observer of C/2°, in accordance with ASTM D1925-70 on 3.2 millimeter thick molded plaques. Color stability measurement was performed using a ColorEye™ 7000A spectrophotometer manufactured by GretagMacbeth, at an illuminant observer of C/2°. The CIE (L, a, b) values were determined on 3.2 mm color chips under reflectance mode according to ASTM 6290, and calibrated using a high gloss polycarbonate standard at a white pigment (TiO$_2$) loading of 5 wt %. The color capability was determined from the absorbance spectral data according to the CIELAB color measurement method detailed by CE (Commission Internationale de l'Eclairage). The values of L, a, and b are reported for the Example tested.

Melt volume rate (MVR) was determined at 330° C. using a 2.16-kilogram weight, over 6 or 4 minutes, in accordance with ASTM D1238 or ISO 1133 respectively. Heat deformation temperature (HDT) was determined on one-eighth inch (3.12 mm) bars according to the method of ASTM D648 or ISO 75. VICAT softening temperature is determined according to ASTM D1525 or ISO 306. MAI ductility is determined according to ASTM D3763 or ISO 6603. Shear viscosity is determined according to ISO 11443. Notched Izod Impact strength (NI) and percent ductility were determined oil one-eighth inch (3.12 mm) bars per ASTM D256, D4812, or ISO 180 at temperatures of 23° C. unless otherwise indicated, and is reported in units of Joules per meter. Charpy impact is measured according to ISO 179. Elastic modulus and Tensile strength were determined according to ASTM D638 at 50 mm/min, and are reported in megapascals (MPa). Flexural modulus was determined according to ASTM D790 or ISO 178, and is reported in megapascals (MPa). Chord modulus is measured at 50 mm/min according to ISO 527. Dynatup impact testing was determined according to ASTM D3763, and is reported in units of Joules. Hardness was determined according to ASTM D785, and is reported in megapascals (MPa). Density was measured according to ISO 1183, and specific gravity was measured according to ASTM D 792.

All polymer blends except where indicated were compounded on a single screw or twin screw extruder, with enough distributive and dispersive mixing elements to produce good mixing between the components of the polymer blends without substantial shear heating degradation of the polymer (as measured by Mw loss after extrusion).

Single screw extrusion conditions as used herein where specified, are as follows: the components were flood fed to a Sterling SSK extruder operating at a maximum of 150 rpm, with a temperature profile of 288 to 316° C. (316° C. as measured on the die). Strands of the hot melt were passed through a water cooling bath and pelletized. The conditions of extrusion are as follows:

| Compounder Type | Single Screw Extruder |
| --- | --- |
| Barrel Size (length) | 1073 mm |
| Screw Design (length, diameter, L/D ratio) | 1073 mm, 45 mm, 24:1 |
| Die | Standard 5 hole die |
| Zone 1 temp | 287° C. |
| Zone 2 temp | 300° C. |
| Zone 3 temp | 310° C. |
| Die temp | 316° C. |
| Screw speed | 150 rpm |

Twin screw extrusion conditions as used herein where specified, are as follows. Twin screw compounding was performed using a Wellier and Pfleiderer ZSI-25 co-rotating twin screw extruder, with a length to diameter (L/D) ratio of about 24:1 or 33:1 (vacuum port located near die face). The twin-screw extruder had enough distributive and dispersive mixing elements to produce good mixing of the polymer compositions, when operating according to one of the following sets of conditions.

The compounds for which the data is shown in Table 4 and 5 were extruded on a twin-screw extruder according to the following conditions:

| Compounder Type | Twin Screw Extruder |
| --- | --- |
| Barrel Size (length) | 610 mm |
| Screw Design (length (L), diameter (D), L/D ratio) | 610 mm, 25 mm, 24:1 |
| Die | Standard 2-hole die |
| Feed (Zone 0) Temp | 130° C. |
| Zone 1 Temp | 280° C. |
| Zone 2 Temp | 305° C. |
| Zone 3 Temp | 310° C. |
| Zone 4 Temp | 315° C. |
| Zone 5 Temp | |
| Zone 6 Temp | |
| Zone 7 Temp | |
| Zone 8 Temp | |
| Zone 9 Temp | — |
| Zone 10 Temp | — |
| Zone 11 Temp | — |
| Zone 12 Temp | — |
| Die Temp | 320° C. |
| Screw speed | 300 rpm |
| Throughput | 10 kg/hr |

The compounds for which the data is shown in Table 6, 7, 9, 11, and 12 were extruded on a twin-screw extruder according to the following conditions:

| Compounder Type | Twin Screw Extruder |
| --- | --- |
| Barrel Size (length) | 800 mm |
| Screw Design (length (L), diameter (D), L/D ratio) | 828 mm, 25 mm, 33:1 |
| Die | Standard 2-hole die |
| Feed (Zone 0) Temp | — |
| Zone 1 Temp | 40° C. |
| Zone 2 Temp | 200° C. |
| Zone 3 Temp | 250° C. |
| Zone 4 Temp | 270° C. |
| Zone 5 Temp | 300° C. |
| Zone 6 Temp | 300° C. |
| Zone 7 Temp | 300° C. |
| Zone 8 Temp | 300° C. |
| Zone 9 Temp | — |
| Zone 10 Temp | — |
| Zone 11 Temp | — |
| Zone 12 Temp | — |
| Die Temp | — |
| Screw speed | 300 rpm |
| Throughput | 20 kg/hr |

The polymer blends were subsequently molded according to ISO 294 on a Husky or BOY injection-molding machine. Polymer blends were compounded and molded at a temperature of 370 or 360° C., although it will be recognized by one skilled in the art that the method is not be limited to these temperatures.

Table 1 is a listing of the polymer components used in the blending experiments below:

TABLE 1

| Component | Description | Source |
| --- | --- | --- |
| CPC-1 | PPPBP/BPA Polycarbonate copolymer (34.8 mol % PPPBP, Mw = 23,100 g/mol) | GE Plastics |
| CPC-2 | PPPBP/BPA Polycarbonate copolymer (34.9 mol % PPPBP, Mw = 29,200 g/mol) | GE Plastics |

TABLE 1-continued

| Component | Description | Source |
|---|---|---|
| CPC-3 | PPPBP/BPA Polycarbonate copolymer (27 mol % PPPBP, Mw = 34,635 g/mol) | GE Plastics |
| CPC-4 | PPPBP/BPA Polycarbonate copolymer (45 mol % PPPBP, Mw = 26,774 g/mol) | GE Plastics |
| CPC-5 | PPPBP/BPA Polycarbonate copolymer (49 mol % PPPBP, Mw = 26,190 g/mol) | GE Plastics |
| CPC-6 | PPPBP/BPA Polycarbonate copolymer (33 mol % PPPBP, Mw = 23,592 g/mol) | GE Plastics |
| HPC-1 | BPA Polycarbonate homopolymer (Mw = 21,900) | GE Plastics |
| HPC-2 | BPA Polycarbonate homopolymer (Mw = 29,900 low flow; grade 100) | GE Plastics |
| HPC-3 | BPA Polycarbonate homopolymer (Mw = 21,800 g/mol, high flow; grade 175) | GE Plastics |
| HPC-4 | BPA Polycarbonate homopolymer (Mw = 26,200 g/mol, medium flow; grade 145) | GE Plastics |
| HPC-5 | BPA Polycarbonate homopolymer (Mw = 30,500 g/mol, low flow; grade 105) | GE Plastics |
| HPC-6 | BPA Polycarbonate homopolymer (Mw = 20,992 g/mol, high flow) | GE Plastics |
| IRGAFOS ® 168 | Tris (2,4-di-tert-butylphenyl)phosphite (Phosphite thermal stabilizer) | Ciba Specialty Chemicals |
| IRGANOX ® 1076 | Octadecyl 3(3,5-ditertbutyl-4-hydroxyphenyl)propionate (Hindered phenol antioxidant) | Ciba Specialty Chemicals |
| PETS | GLYCOLUBE ® P (Pentaerythritol tetrastearate; mold release agent) | Lonza |
| ERL 4221 | Cycloaliphatic Epoxide ERL 4221 Epoxy Plasticizer (3,4-epoxycyclohexylmethyl-3,4-epoxycyclohexyl carboxylate) | Union Carbide Corp. |
| ADR 4368 | JONCRYL ® ADR 4368 (styrene-acrylate-epoxy oligomer) | Johnson Polymer |
| $H_3PO_3$ | Phosphorous acid ($H_3PO_3$) | |
| p-TSA | p-Toluenesulfonic acid (p-TSA) | |

Examples 1-9

Examples 1 to 9 (Exs. 1 to 9) below were prepared to illustrate the effect of the molecular weight (Mw) of the PPPBP-BPA copolymer when blended with a lower Mw polycarbonate (CPC-1, Mw=about 23K) and a higher Mw BPA homopolycarbonate (HPC-2, Mw=29,900). The properties observed for these blends included the miscibility of the component polymers as qualified by general appearance ("clear", "slight haze", "opaque") and haze as determined on 3.2.mm molded plaques according to ASTM D1003-00, and the heat stability of the blend reported by the percent loss in Mw after extrusion for the composition.

Table 2 shows blend proportions and properties for CPC-1 and HPC-2. CPC-1 and HPC-2 were melt blended at different weight percentages based on the total weight of CPC-1 and BPC-2 for compositions prepared by the single screw extrusion method, as shown in Table 1. The visual appearances of the polymer blends, the haze values of the blends, and the molecular weight changes before and after extrusions are summarized in Table 2.

TABLE 2

| Example | CPC-1 in blend, wt % | HPC-2 in blend, wt % | PPPBP in Blend, Mol % | Blend Appearance | Haze | Mw Before Extrusion | Mw After Extrusion | Mw Change, Post-extrusion (%) |
|---|---|---|---|---|---|---|---|---|
| Ex. 1 | 90 | 10 | 31 | Clear | 1.72 | 23688 | 23450 | 1 |
| Ex. 2 | 80 | 20 | 28 | Clear | 0.56 | 24420 | 24340 | 0.1 |
| Ex. 3 | 70 | 30 | 24 | Clear | 0.48 | 25112 | 24980 | 1 |
| Ex. 4 | 60 | 40 | 21 | Clear | 0.48 | 25803 | 25675 | 0.1 |
| Ex. 5 | 50 | 50 | 17.4 | Clear | 0.46 | 26483 | 26275 | 1 |
| Ex. 6 | 40 | 60 | 14 | Clear | 0.42 | 27150 | 26980 | 1 |
| Ex. 7 | 30 | 70 | 10.5 | Clear | 0.38 | 27855 | 27705 | 1 |
| Ex. 8 | 20 | 80 | 7 | Clear | 1.09 | 28528 | 28340 | 1 |
| Ex. 9 | 10 | 90 | 3.5 | Clear | 0.64 | 29205 | 29015 | 1 |

Data in Table 2 show that, for the above blended polymers CPC-1 (34.8 mol % of PPPBP) and UPC-2, exhibited good miscibility over the entire compositional range from 90 wt % of CPC-1 and 10 wt % of HPC-2 to 10 wt % of CPC-1 and 90 wt % HPC-2, as indicated by clear appearances and haze values of less than 2. In each of these Examples, little or no change in Mw post extrusion (relative to pre-extrusion) was observed, where Examples 1-9 each showed Mw changes as a percentage of 1% or less. Data in Table 2 also indicates that the weight averaged molecular weight (Mw) losses for all polymer blends after the extrusion were less than or equal to 3%, suggesting that all blends were heat stable according to the conditions for single screw extrusion provided above.

Examples 10-14 and Comparative Examples 1-4

Examples 10-14 (Exs. 10-14) and Comparative Examples 1-4 (CExs. 1-4) illustrate the effect of the molecular weight (Mw) of the first polycarbonate (CPC-2) and the second polycarbonate (HPC-2) on the miscibility of CPC-2 and HPC-2 and the heat stability of the blend for compositions prepared by the single screw extrusion method.

In Exs. 10-14 and CExs. 1-4, CPC-2 was a copolycarbonate consisting essentially of structural units derived from PPPBP and bisphenol A and having 34.9 mol % of PPPBP. The Mw of CPC-2 was about 29,200 g/mol. HPBC-2 was the same as that used in Ex. 1. The Mw of HPC-2 was about 29,900 g/mol. CPC-2 and HPC-2 were melt blended at different weight percentages based on the total weight of CPC-2 and HPC-2 as shown in Table 3. The visual appearances of the polymer blends, the haze values of the blends, and the molecular weight changes before and after extrusions are summarized in Table 3.

less than or equal to 3%, indicating high heat stability for these blends at or below this temperature.

Figure 2:
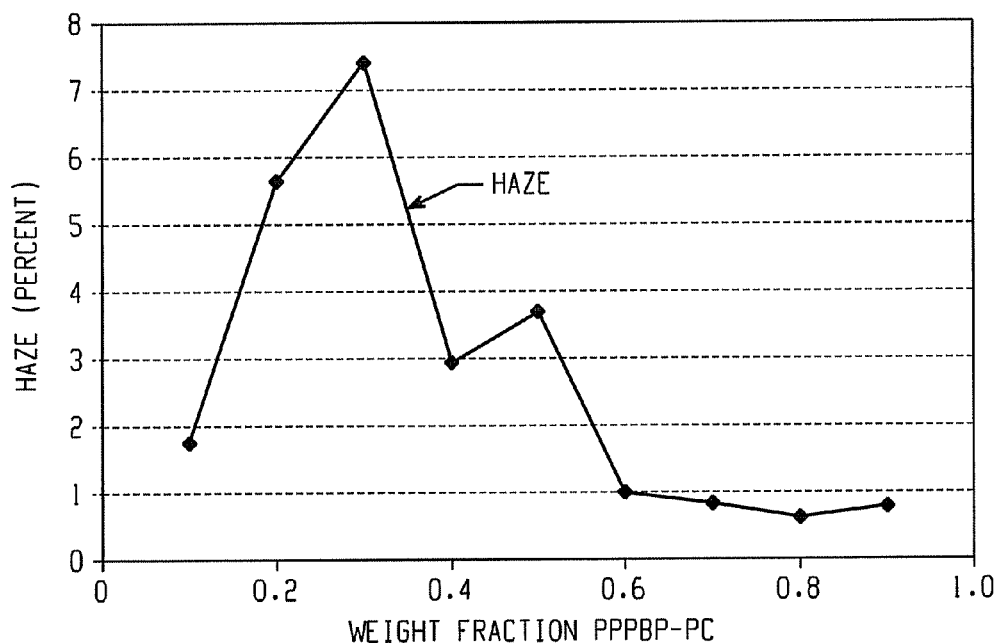
FIG. 2 is a plot of haze versus weight fraction for a blend of a higher Mw (Mw 29,200 g/mol) polycarbonate having 35 mol % structural units derived from 2-phenyl-3,3-bis(4-hydroxyphenyl)phthalimidine and a bisphenol A polycarbonate homopolymer (Mw 29,900 g/mol)
Figure 3:
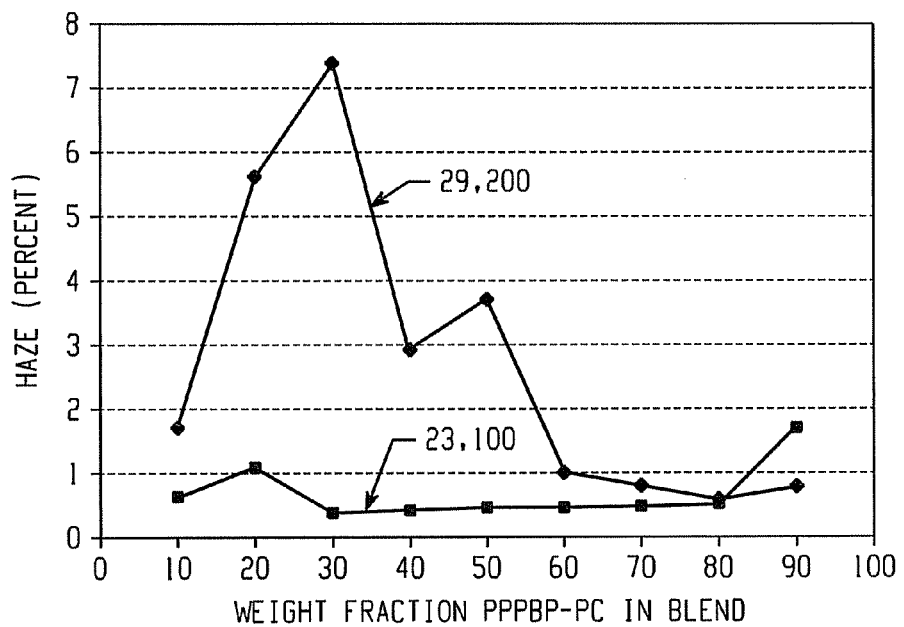
FIG. 3 is an overlaid plot of FIGS. 1 and 2.
Figure 4:
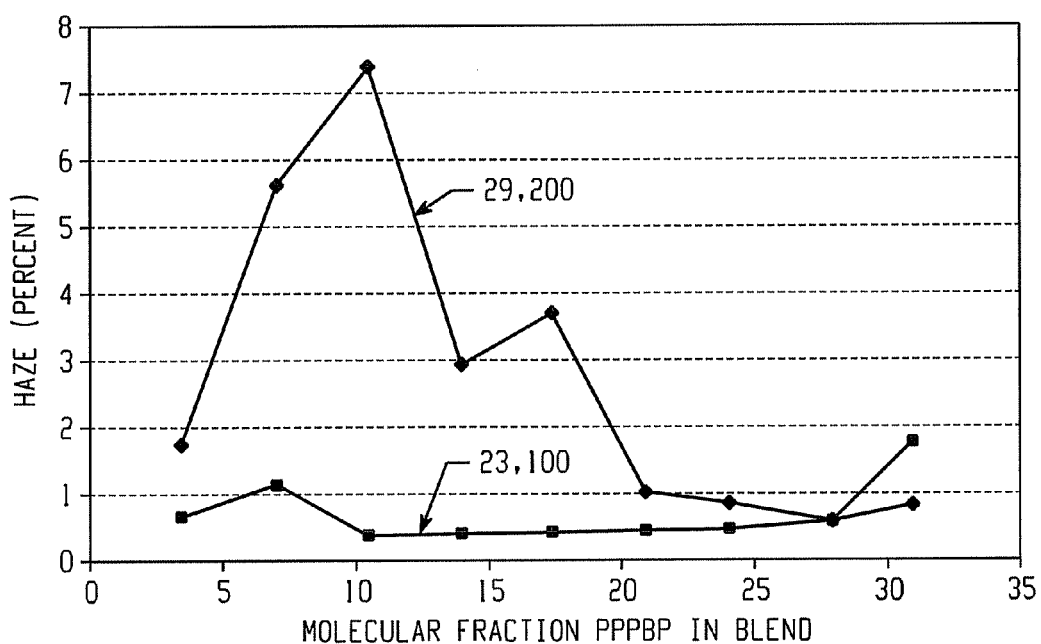
FIG. 4 is an overlaid plot of haze versus total mole fraction of 2-phenyl-3,3-bis(4-hydroxyphenyl)phthalimidine for a blend of a lower Mw (Mw 23,100 g/mol) polycarbonate and a higher Mw (Mw 29,200 g/mol) polycarbonate each having 35 mol % structural units derived from 2-phenyl-3,3-bis(4-hydroxyphenyl)phthalimidine, and a bisphenol A polycarbonate homopolymer (Mw 29,900 g/mol)

The profile of haze value vs. weight ratio (wt % of CPC-2) is shown in FIG. 2. For easier comparison between FIG. 1 and FIG. 2, the profiles of haze value vs. weight ratio (wt % of PPPBP/BPA copolymer) for Exs. 1 to 9 (low Mw CPC-1) and Exs. 10 to 14 and CExs. 1-4 (high Mw CPC-2) are shown in FIG. 3 (overlapping figure of FIGS. 1 and 2). In addition, the profiles of haze value vs. PPPBP mol % in blend for Exs. 1 to 9 (low Mw CPC-2) and Exs. 10 to 14 and CExs. 1-4 (high Mw CPC-2) are shown in FIG. 4.

Example 15 and Comparative Examples 5-6

Example 15 and Comparative Examples 5-6 (CExs. 5-6) illustrate the effect of the Mw and PPPBP level in PPPBP/BPA copolymer on miscibility with BPA homopolymer for compositions prepared by the twin screw extrusion method.

In CExs. 5-6, CPC-3 was a copolycarbonate having 27 mol % PPPBP of structural units derived from PPPBP and the balance bisphenol A. The Mw of CPC-3 was about 34,635

TABLE 3

| Example | CPC-2 in blend, wt % | HPC-2 in blend, wt % | Blend Appearance | Edge Haze (Y/N) | Haze (%) | Mw Before Extrusion (g/mol) | Mw After Extrusion (g/mol) | Mw Change, % |
|---|---|---|---|---|---|---|---|---|
| Ex. 10 | 90 | 10 | Clear | No | 0.8 | 29251 | 28850 | 1% |
| Ex. 11 | 80 | 20 | Clear | No | 0.6 | 29310 | 28920 | 1% |
| Ex. 12 | 70 | 30 | Clear | No | 0.82 | 29372 | 28913 | 2% |
| Ex. 13 | 60 | 40 | Slight Haze | Yes | 1.01 | 29375 | 28925 | 2% |
| CEx. 1 | 50 | 50 | Haze | Yes | 3.71 | 29410 | 29016 | 1% |
| CEx. 2 | 40 | 60 | Haze | Yes | 2.93 | 29408 | 29149 | 1% |
| CEx. 3 | 30 | 70 | Haze | Yes | 7.39 | 29423 | 29298 | 0.1% |
| CEx. 4 | 20 | 80 | Haze | Yes | 5.63 | 29525 | 29283 | 1% |
| Ex. 14 | 10 | 90 | Clear | No | 1.74 | 29643 | 29308 | 1% |

Data in Table 3 indicates when CPC-2 had a Mw of about 29,200 g/mol (34.9 mol % of PPPBP) and HPC-2 had a Mw of about 29,900 g/mol, CPC-2 and HPC-2 were miscible only at certain particular weight ratios. Specifically, CPC-2 and HPC-2 were miscible in the range of 90 wt % of CPC-2 and 10 wt % of HPC-2 to 60 wt % of CPC-2 and 40 wt % of HPC-2 (Exs. 10 to 13). In addition, CPC-2 and HPC-2 were miscible at a weight ratio of 10 wt % of CPC-2 and 90 wt % of HPC-2.

g/mol. HPC-2 was a homopolycarbonate having 100 mol % of structural units derived from BPA. The Mw of HPC-2 was about 29,900 g/mol. CPC-3 and HPC-2 were melt blended at different weight percentages based on the total weight of CPC-3 and UPC-2 as shown in Table 4. The visual appearances of the polymer blends, the haze values of the blends, glass transition temperature (Tg), and the molecular weight changes before and after extrusion are summarized in Table 4.

TABLE 4

| Example | CPC-3 in blend, wt % | HPC-2 in blend, wt % | Blend Appearance | Haze | Mw Before Extrusion | Mw After Extrusion | Mw Change, % | Tg, ° C. |
|---|---|---|---|---|---|---|---|---|
| Ex. 15 | 80 | 20 | Clear | 2.6 | 58160 | 57354 | 1% | 179 |
| CEx. 5 | 60 | 40 | Clear | 2.1 | 52764 | 49263 | 7% | 163 |
| CEx. 6 | 20 | 80 | Clear | 1.8 | 54284 | 49544 | 9% | 158 |

All of the above blends had clear or slightly hazy appearances and haze values of less than 2. The molecular weigh losses after extrusions for Exs. 10-14 were less than or equal to 3%, indicating light heat stability for all blends at or below that temperature.

However, CPC-2 and HPC-2 were not miscible in the range of 50 wt % of CPC-2 and 50 wt % of HPC-2 to 20 wt % of CPC-2 and 80 wt % of HPC-2, as indicated by hazy appearances and high haze values (CExs. 1-4). Nevertheless, the molecular weight losses after extrusion at for CExs. 1-4 were Data in Table 4 indicates that for CPC-3 and HPC-2 each with high Mw (34,635 g/mol and 29,900 g/mol, respectively; 27 mol % of PPPBP in CPC-3), the blend of CPC-3 and HPC-2 exhibited desirable properties. For example, the blends in CExs. 5 and 6 had haze values less than or equal to 2.6%. However, whereas Example 15 showed less than 3% Mw loss, the losses of molecular weight after extrusion at 300 to 320° C. were greater than 3% for CExs. 5-6. All three blends had a single glass transition temperature measured by DSC and clear appearances, indicating good visual miscibility between CPC-3 and HPC-2.

Example 16-17 and Comparative Examples 7-9

Example 16 (Ex. 15) and CExs. 7-9 illustrate the effect of the Mw and the PPPBP level in the PPPBP/BPA copolymer on miscibility of compositions prepared by the twin screw extrusion method.

In Ex. 16 and CExs. 7-9, CPC-4 was a copolycarbonate consisting essentially of structural units derived from PPPBP and bisphenol A and having 45 mol % of PPPBP. The Mw of CPC-4 was about 26,773 g/mol. HPC-2 was a homopolycarbonate consisting essentially of structural units derived from bisphenol A and having 100 mol % of BPA. The Mw of HPC-2 was about 29,900 g/mol. CPC-4 and HPC-2 were melt blended at different weight percentages based on the total weight of CPC-4 and BPC-2 as shown in Table 5. The visual appearances of the polymer blends, the haze values of the blends, glass transition temperature (Tg), and the molecular weight changes before and after extrusions are summarized in Table 5.

TABLE 5

| Example | CPC-4 in blend, wt % | HPC-2 in blend, wt % | Blend Appearance | Haze | Mw Before Extrusion | Mw After Extrusion | Mw Change, % | Tg, °C. |
|---|---|---|---|---|---|---|---|---|
| CEx. 7 | 80 | 20 | Clear | 2.1 | 45775 | 41675 | 9% | 202 |
| CEx. 8 | 60 | 40 | Clear | 2 | 48636 | 45661 | 6% | 189 |
| Ex. 16 | 50 | 50 | Clear | 1.4 | 49872 | 48206 | 3% | 180 |
| Ex. 17 | 25 | 75 | Clear | 1.8 | 50323 | 46822 | 2% | 158 |

Data in Table 5 indicates that for blends where the Mw of CPC-4 and HPC-2 were both high (26,773 g/mol and 29,900 g/mol, respectively; and 45 mol % of PPPBP in CPC-4), the blends in CExs. 7 and 8 each had haze values less than or equal to 3.0. However, these blends of CPC-4 and IPC-2 also had undesirable properties, specifically the loss of molecular weight after extrusion which was greater than 3% for these two blends. In Ex. 16, the Mw change value was acceptable if at the limit of 3%, and the Tg was at a desirable value of about 180° C. Ex. 17, though the haze value was less than or equal to 2.6% and the molecular weight loss was less than or equal to 3%, the Tg tended toward a low value of only 158° C. However, all blends in CExs. 7-8 were clear, indicating good miscibility.

Examples 18-27 (Twin Screw Extruder DOE)

Compositions prepared using twin-screw extrusion, to determine in greater detail the effect of such conditions on various properties, are detailed in Table 6, below.

TABLE 6

| Component | Ex. 18 | Ex. 19 | Ex. 20 | Ex. 21 | Ex. 22 |
|---|---|---|---|---|---|
| CPC-6 (33 mol % PPPBP-BPA (MF)) | 99.58 | 77 | 77 | 77 | 82 |
| HPC-5(PC 105; LF) | — | 22.58 | — | — | 17.58 |
| HPC-4 (PC 145; MF) | — | — | 22.58 | — | — |
| HPC-3 (PC 175; HF) | — | — | — | 22.58 | — |
| PETS G 333 (LOXIOL ® EP8578) | 0.3 | 0.3 | 0.3 | 0.3 | 0.3 |
| IRGAFOS ® 168 | 0.08 | 0.08 | 0.08 | 0.08 | 0.08 |
| IRGANOX ® 1076 | 0.04 | 0.04 | 0.04 | 0.04 | 0.04 |
| Mw (g/mol, calculated) | 22,903 | 24,597 | 23,694 | 22,565 | 24,222 |
| Optical properties (@ 2.5 mm) | | | | | |
| L | 95.2 | 95.5 | 95.5 | 95.4 | 95.4 |
| a | −0.401 | −0.290 | −0.309 | −0.344 | −0.305 |
| b | 2.444 | 1.697 | 1.79 | 1.949 | 1.828 |
| YI[a] | 4.4 | 3.2 | 3.3 | 3.6 | 3.4 |
| Transmission[b] (%) | 89.9 | 90.5 | 90.5 | 90.5 | 90.5 |
| Haze[b] (%) | 0.36 | 0.44 | 0.39 | 0.28 | 0.41 |
| Optical properties (@ 3.2 mm) | | | | | |
| L | 95.0 | 95.3 | 95.3 | 95.4 | 95.4 |
| a | −0.492 | −0.380 | −0.394 | −0.358 | −0.355 |
| b | 3.022 | 2.196 | 2.268 | 1.985 | 2.004 |
| YI[a] | 5.4 | 4.0 | 4.1 | 3.6 | 3.7 |
| Transmission[b] (%) | 89.6 | 90.1 | 90.2 | 90.4 | 90.3 |
| Haze[b] (%) | 0.44 | 0.53 | 0.49 | 0.38 | 0.53 |

TABLE 6-continued

| | | | | | |
|---|---|---|---|---|---|
| MVR$^c$ (330° C./2.16 kg, 4 min.) (cm³/10 min.) | 19.4 | 20.4 | 23.2 | 29.3 | 19.7 |
| Tg (DSC, on molded parts) | 194.1 | 182.4 | 182.3 | 181.5 | 185.3 |

| Component | Ex. 23 | Ex. 24 | Ex. 25 | Ex. 26 | Ex. 27 |
|---|---|---|---|---|---|
| CPC-6 (33 mol % PPPBP-BPA (MF)) | 82 | 82 | 87 | 87 | 87 |
| HPC-5(PC 105; LF) | — | — | 12.58 | — | — |
| HPC-4 (PC 145; MF) | 17.58 | — | — | 12.58 | — |
| HPC-3 (PC 175; HF) | — | 17.58 | — | — | 12.58 |
| PETS G 333 (LOXIOL ® EP8578) | 0.3 | 0.3 | 0.3 | 0.3 | 0.3 |
| IRGAFOS ® 168 | 0.08 | 0.08 | 0.08 | 0.08 | 0.08 |
| IRGANOX ® 1076 | 0.04 | 0.04 | 0.04 | 0.04 | 0.04 |
| Mw (g/mol, calculated) | 23,519 | 22,640 | 23,847 | 23,344 | 22,715 |
| Optical properties (@ 2.5 mm) | | | | | |
| L | 95.4 | 95.5 | 95.3 | 95.4 | 95.3 |
| a | −0.335 | −0.279 | −0.408 | −0.366 | −0.358 |
| b | 2.03 | 1.653 | 2.466 | 2.145 | 2.234 |
| YI$^a$ | 3.7 | 3.1 | 4.5 | 3.9 | 4.1 |
| Transmission$^b$ (%) | 90.4 | 90.5 | 90.1 | 90.3 | 90.1 |
| Haze$^b$ (%) | 0.55 | 0.5 | 0.44 | 0.28 | 0.59 |
| Optical properties (@ 3.2 mm) | | | | | |
| L | 95.2 | 95.3 | 95.1 | 95.2 | 95.1 |
| a | −0.454 | −0.400 | −0.510 | −0.480 | −0.504 |
| b | 2.684 | 2.331 | 3.11 | 2.787 | 3.079 |
| YI$^a$ | 4.8 | 4.2 | 5.6 | 5.0 | 5.5 |
| Transmission$^b$ (%) | 90 | 90.2 | 89.8 | 89.9 | 89.8 |
| Haze$^b$ (%) | 0.56 | 0.4 | 0.56 | 0.35 | 0.51 |
| MVR$^c$ (330° C./2.16 kg, 4 min.) (cm³/10 min.) | 22.6 | 27.2 | 21.2 | 21.4 | 26.2 |
| Tg (DSC, on molded parts) | 184.5 | 184.4 | 186.9 | 186.7 | 187.1 |

$^a$YI = ASTM D1925-70;
$^b$Haze, % T = ASTM D 1003-00;
$^c$MVR = ISO 1133, averaged value of 2 runs.

As can be seen in the data of Table 6, the highest Tg is obtained in the non-blended composition (Ex. 18). The Tg increases with increasing % PPPBP in the composition as seen in the lowest Tgs of 181.5° C. to 182.3° C. (Exs. 19-21) with 77 wt % PPPBP polymer loading; intermediate Tgs of 184.4° C. to 185.3° C. (Exs. 22-24) with 82 wt % PPPBP-BPA; and higher Tgs of 186.7° C. to 187.1° C. (Exs. 25-27) with 87 wt %. Average yellowness index (YI) also increases with increasing PPPBP-BPA loading (3.6-4.1 for Exs. 19-21; 3.7-4.8 for Exs. 22-24; and 5.0-5.6 for Exs. 25-27).

Examples 28-33

Examples 28-33 were prepared by single screw extrusion (316° C. on the die; molded at 332° C.) using the compositions detailed in Table 7, below. The corresponding molecular weight data for the compositions is also provided in Table 7.

As clearly seen in the data in Table 7, the greatest overall Mw loss occurs during extrusion ("powder to pellet"). The lowest overall Mw loss occurs using the unblended composition in Ex. 28-30 (which are replicate runs). However, for the blended compositions, the lowest Mw loss for both powder to pellet and pellet to part (and hence overall powder to part) can be seen in Examples 33-35 (which are replicate runs).

Examples 34 and 35

Examples 34 and 35 were prepared using unblended polymer (Ex. 34) having 33 wt % PPPBP-BPA and an 80/20 w/w blend of this polymer with BPA-PC (Ex. 35). The data were determined using blends prepared by single screw extrusion as described above. The results are provided in Table 8.

TABLE 7

| | Ex. 28 | Ex. 29 | Ex. 30 | Ex. 31 | Ex. 32 | Ex. 33 |
|---|---|---|---|---|---|---|
| CPC-6 (33 mol % PPPBP-BPA) | 100 | 100 | 100 | 80 | 80 | 80 |
| HPC-2 (PC 100) | — | — | — | 10 | 10 | 10 |
| HPC-3 (PC 175) | — | — | — | 10 | 10 | 10 |
| IRGAFOS ® 168 | 0.08 | 0.08 | 0.08 | 0.08 | 0.08 | 0.08 |
| IRGANOX ® 1076 | 0.04 | 0.04 | 0.04 | 0.04 | 0.04 | 0.04 |
| PETS | 0.27 | 0.27 | 0.27 | 0.27 | 0.27 | 0.27 |
| Powder Mw (g/mol) | 23,015 | 23,330 | 23,467 | 23,472 | 23,774 | 23,883 |
| Pellet Mw (g/mol) | 22,904 | 23,037 | 23,181 | 22,996 | 23,363 | 23,714 |
| Part Mw (g/mol) | 22,847 | 23,136 | 23,311 | 22,828 | 23,286 | 23,611 |
| Powder to pellet dMw (%) | −0.48% | −1.26% | −1.22% | −2.03% | −1.73% | −0.71% |
| Pellet to part dMw (%) | −0.25% | 0.43% | 0.56% | −0.73% | −0.33% | −0.43% |
| Powder to part dMw (%) | −0.73% | −0.83% | −0.66% | −2.74% | −2.05% | −1.14% |

Exs. 28-30: 100% of 33 mole % PPPBP-BPA: YI = 6.3, % T = 87.6 and Haze = 0.7% at 3.2 mm.
Exs. 31-33: 80/20 Blend of 33 mole % PPPBP-BPA with BPA-PC: YI = 5.7, % T = 87.9%, Haze = 0.5% at 3.2 mm.

TABLE 8

| Test Code | Units | Ex. 34 | Ex. 35 |
|---|---|---|---|
| Composition | — | CPC-6 | 80:20 blend CPC-6/HPC-5 |
| Glass Transition Temp (by DSC; Tg) | °C. | 195.9 | 183.6 |
| MFR at 330° C./2.16 Kgf (ASTM D 1238) | g/10 min | 24.5 | 32.6 |
| MFR at 330° C./2.16 Kgf (ISO 1133) | g/10 min | 22.6 | 29.1 |
| Density (ISO 1183) | g/cm$^3$ | 1.21 | 1.21 |
| Flexural Modulus (ASTM D 790) | MPa | 2680 | 2620 |
| Flex Stress@5% Strain (ASTM D 790) | MPa | 107 | 106 |
| Flexural Stress@Yield (ASTM D 790) | MPa | 126 | 123 |
| Flexural Modulus-(ISO 178) | MPa | 2625 | 2554.2 |
| Stress@3.5% strn-(ISO 178) | MPa | 80.89 | 79.59 |
| Modulus of Elasticity (ASTM D 638 (50 mm/min.)) | MPa | 3020 | 3020 |
| Stress at Yield (ASTM D 638 (50 mm/min.)) | MPa | 76.4 | 73.2 |
| Stress at Break (ASTM D 638 (50 mm/min.)) | MPa | 61.3 | 62.4 |
| Elongation at Yield (ASTM D 638 (50 mm/min.)) | % | 7.1 | 7 |
| Elongation at Break-(ASTM D 638 (50 mm/min.)) | % | 37.4 | 79 |
| Chord Modulus (ISO 527, 50 mm/min.) | MPa | 2906.8 | 2800.6 |
| Stress@Yield (ISO 527, 50 mm/min.) | MPa | 78.4 | 75.54 |
| Stress@Break (ISO 527, 50 mm/min.) | MPa | 62.9 | 60.72 |
| Strain@Yield (ISO 527, 50 mm/min.) | % | 7.28 | 7.02 |
| Strain@Break (ISO 527, 50 mm/min.) | % | 42.32 | 56.7 |
| Charpy 23° C., V-notch Edge 80 * 10 * 4 sp = 62 mm (ISO 179) | kJ/m$^2$ | 19.4 | 18.43 |
| Izod Impact, notched, 23° C. (ASTM D256) | J/m | 76.9 | 96.2 |
| HDT, 0.45 MPa, 3.2 mm, unannealed (ASTM D 648) | °C. | 186.6 | 175.7 |
| HDT, 1.82 MPa, 3.2 mm, unannealed (ASTM D 648) | °C. | 174.6 | 163.7 |
| HDT/Af, 0.45 MPa Flatw 80 * 10 * 4 sp = 64 mm (ISO 75) | °C. | 184.5 | 173 |
| HDT/Af, 1.8 MPa Flatw 80 * 10 * 4 sp = 64 mm (ISO 75) | °C. | 168.8 | 157.4 |
| Vicat Softening Temp, Rate B/50 (ASTM D 1525) | °C. | 189 | 178 |
| Vicat Softening Temp, Rate B/120 (ASTM D 1525) | °C. | 190 | 179 |
| Vicat Softening Temp, Rate B/50 (ISO 306) | °C. | 188.5 | 177.6 |
| Vicat Softening Temp, Rate B/120 (ISO 306) | °C. | 190.1 | 179.7 |
| MAI Total Energy, 23° C. (ASTM D3763) | J | 62.9 | 66 |
| MAI Energy@max force, 23° C. (ISO 6603) | J | 133.53 | 123.98 |
| Water Absorption (%) (GEP method) | % | 0.37 | 0.34 |
| CTE (dir. of Flow), −40 to 150° C. | μm/(m-°C.) | 50.82 | 55.28 |
| CTE (Cross-Flow), −40 to 150° C. | μm/(m-°C.) | 52.3 | 59.92 |
| Mold shrinkage parallel-Avg (4" dia MAI disk.) | % | 1.01 | 0.96 |
| Mold shrinkage perpendicular-Avg (4" dia MAI disk) | % | 1.03 | 0.99 |

Examples 36 to 46, and Comparative Examples 9-10

Examples 36 to 48 were prepared to determine the effect on color stability of PPPBP-BPA copolymer blends with acid additives and epoxy compounds. The compositions were prepared by dry blending with all the additives in a tumbler/mixer. The acid was added as a dilute solution in water (1.0 wt % acid in water) and it was sprayed on limited amount of the polymer powder (about 0.23 kg), which was then mixed with the rest of the materials in the mixer.

The powder mixture was then extruded on a single screw extruder as described above. Strands of hot melt were passed through a water-cooling bath and then pelletized. Pellets were used for molding 7.6 cm×5.1 cm×3.2 mm plaques, which were used for testing. Before molding the pellets were dried for 4 hours at 135° C. Heat aging was performed in a convection ovens with the temperature set at 160° C.±0.2° C. for 2 to 4 weeks. The amounts and data are provided in Tables 9 and 10, below.

TABLE 9

|  | Ex. 36 | Ex. 37 | Ex. 38 | Ex. 39 | Ex. 40 | Ex. 41 |
|---|---|---|---|---|---|---|
| CPC-6 (33 mole % PPPBP-BPA) | 80 | 80 | 80 | 80 | 80 | 80 |
| HPC-5 (100 grade PC) | 20 | 20 | 20 | 20 | 20 | 20 |
| IRGAFOS ® 168 | 0.08 | 0.08 | 0.08 | 0.08 | 0.08 | 0.08 |
| PETS | 0.27 | 0.27 | 0.27 | 0.27 | 0.27 | 0.27 |
| IRGANOX ® 1076 | 0.04 | 0.04 | 0.04 | 0.04 | 0.04 | 0.04 |
| H$_3$PO$_3$ (1 wt % aqueous soln.) | — | — | 0.05 | 0.05 | 0.10 | 0.10 |
| ERL 4221 epoxy | — | 0.3 | — | 0.3 | — | 0.3 |
| YI at 326° C. | 6.1 | 3.7 | 3.8 | 3.5 | 3.3 | 3.4 |
| YI at 360° C. | 13.1 | 9 | 6.9 | 6.7 | 3.9 | 5.6 |
| dYI/day at 160° C. | 0.29 | 0.29 | 0.36 | 0.31 | 0.42 | 0.31 |
| % T at 326° C., % | 87.6 | 88.6 | 88.4 | 88.5 | 88.6 | 88.6 |
| Haze at 326° C., % | 1.4 | 0.9 | 1.1 | 0.7 | 1 | 1.1 |
| Mw powder, g/mol | 25,274 | 25,274 | 25,274 | 25,274 | 25,274 | 25,274 |
| Mw pellets, g/mol | 24,628 | 24,776 | 24,875 | 24,749 | 25,085 | 24,704 |
| dMw (powder to pellet), % | −2.6 | −2.0 | −1.6 | −2.1 | −0.7 | −2.3 |
| dMw (1 week at 80° C./80% RH: %) | −6.4 | −6.3 | −12.6 | −6.3 | −14.2 | −8.3 |

TABLE 10

| Description | Ex. 42 | CEx. 9 | Ex. 43 | Ex. 44 | CEx. 10 | Ex. 45 | Ex. 46 |
|---|---|---|---|---|---|---|---|
| CPC-6 (33 mole % PPPBP-BPA) | 100 | 100 | 100 | 100 | 100 | 100 | 100 |
| IRGAFOS ® 168 | 0.08 | 0.08 | 0.08 | 0.08 | 0.08 | 0.08 | 0.08 |
| PETS | 0.27 | 0.27 | 0.27 | 0.27 | 0.27 | 0.27 | 0.27 |
| IRGANOX ® 1076 | 0.04 | 0.04 | 0.04 | 0.04 | 0.04 | 0.04 | 0.04 |
| $H_3PO_3$ (1 wt % aqueous soln.) | — | 0.10 | 0.10 | 0.10 | — | — | — |
| p-TSA (1 wt % aqueous soln.) | — | — | — | — | 0.025 | 0.025 | 0.025 |
| ERL 4221 | — | — | 0.10 | — | — | — | 0.05 |
| ADR 4368 | — | — | — | 0.15 | — | 0.05 | — |
| YI at 326° C. | 5.88 | 4.80 | 4.18 | 4.56 | 4.45 | 4.49 | 4.03 |
| dYI/day at 160° C. | 0.25 | 0.46 | 0.34 | 0.36 | 0.79 | 0.44 | 0.49 |
| YI at 360° C. | 16.13 | 9.61 | 5.78 | 7.43 | 6.15 | 7.07 | 4.96 |
| % T at 326° C., % | 87.12 | 87.60 | 88.09 | 87.99 | 88.02 | 88.21 | 88.25 |
| Haze at 326° C., % | <1.5 | <1.5 | <1.5 | <1.5 | <1.5 | <1.5 | <1.5 |
| Mw powder, g/mol | 26,093 | 26,093 | 26,093 | 26,093 | 26,093 | 26,093 | 26,093 |
| Mw molded part, g/mol | 25,783 | 25,054 | 25,502 | 26,054 | 24,041 | 25,838 | 25,682 |
| dMw(powder to part), % | −1.19 | −3.98 | −2.26 | −0.15 | −7.86 | −0.98 | −1.58 |
| dMw (1 week at 80° C./80% RH: %) | −20.7 | −24.4 | −21.3 | −25.0 | −36.4 | −22.0 | −22.5 |

In the data in Table 9, it can be seen that the use of the combination of $H_3PO_3$ with an epoxy additive (Exs. 39 and 41) for stabilizing a polycarbonate blend of a PPPBP-PC copolycarbonate and a BPA homopolycarbonates exhibits better overall balance of low yellowness and low dYI than the compositions prepared without the combination of acid and epoxy. In addition, the change in Mw for each of Examples 37, 39, and 41 for heat and moisture stability, is less than that of Examples 38 and 40, each of which contains only acid additive, and is comparable to the Mw change for Ex. 36 which has no acid or epoxy additive. Similarly, in Table 10, the combination of acid and epoxy additive for a thermoplastic composition comprising a single PPPBP copolymer provides the lowest dYI for the compositions (Exs. 42-46). Of these, the more desirable lower dYI is obtained with the weaker acid ($H_3PO_3$), irrespective of which epoxy additive is used. Addition of acid stabilizer alone ($H_3PO_3$ or p-TSA) improves the color stability on molding but results in higher color shift (dYI/day) during long-term heat aging. The change in Mw for each of Examples 43-46, for either molding or for heat and moisture stability, is less than that of Comparative Examples 9 and 10, each of which contains only acid additive, and is comparable to the Mw change for Ex. 42 which has no acid or epoxy additive. In addition, CEx 9 and CEx. 10, which contain only acid, have relatively high Mw loss powder to part relative to Examples 42-46; adding an epoxy additive to a composition similar to CEx 9 (such as Ex 43) or to CEx 10 (such as Ex 45), however, can be seen to counteract this Mw loss effect.

The addition of epoxy in combination with the acid to the thermoplastic composition with either a single PPPBP-PC copolycarbonate, or a blend, improves YI and Mw stability, where use of either the acid additive alone, the epoxy additive alone, or with neither additive present, has either no beneficial effect or can significantly adversely affect the properties of the thermoplastic composition, such as the Mw stability. Inclusion of both the acid additive and the epoxy additive reduces the color shift (dYI/day) during long-term heat aging versus the samples that contained only acid. The addition of the epoxy does not diminish the improvement in color stability on molding that was brought by the acid addition. It can also be seen that addition of epoxy in combination with the acid improves the stability of the materials as see by the smaller loss in Mw and percent loss in Mw after 1 week at either 80° C. and 80% relative humidity (in Table 9) or 90° C. and 90% RH (in Table 10).

Examples 47-50 and Comparative Examples 11-15

A comparison study of blends of PPPBP-BPA copolycarbonates prepared to have Mw of about 23,000 to about 35,000 g/mol, but with different PPPBP loadings as shown in Table 11, and blended with bisphenol-A homopolycarbonate (HPC-4, with high miscibility across Mw when blended with PPPBP-BPA copolycarbonates), was preformed at a constant weight ratio of 50:50 PPPBP-BPA copolycarbonate to BPA homopolycarbonate, to determine the effect of copolymer composition on miscibility. The data were determined using blends prepared by single screw extrusion as described above. The blended composition information, and the resulting data, are provided in Table 11, below.

TABLE 11

| Example | % PPPBP in copolymer (mol %) | Clarity | Tg (° C.) | Mw (g/mol) | Haze, % | Haze range |
|---|---|---|---|---|---|---|
| CEx. 11 | 48.0 | hazy | 213; 158 | 20,850 | 86.62 | >10 |
| CEx. 12 | 48.0 | hazy | 216; 155 | 26,500 | 89.08 | >10 |
| CEx. 13 | 42.0 | hazy | 208.3; 158 | 27,339 | N/A | >10 |
| CEx. 14 | 39.0 | hazy | 201.0; 158 | 28,024 | N/A | >10 |
| CEx. 15 | 36.8 | slight haze | 180; 152 | 25,150 | 2.14 | — |
| Ex. 47 | 35.0 | clear | 177 | 24,000 | N/A | <1.5 |
| Ex. 48 | 35.0 | clear | 176 | 21,000 | N/A | <1.5 |
| Ex. 49 | 34.8 | clear | 176 | 23,100 | 0.46 | <1.5 |
| Ex. 50 | 25.0 | clear | 169 | 24,600 | N/A | <1.5 |

*Note:
All Examples and Comparative Examples are 50 wt % blend with HPC-4, medium flow grade bisphenol-A homopolycarbonate (Mw = 29,900)

As seen in the data in Table 11, Examples 47-50 all have estimated haze levels below 3% (shown as <1.5, measured at 3.2 mm thickness, ASTM-D1003-00), and have a single Tg indicating complete miscibility. Comparative Example 15 has a haze of 2.14% but nonetheless a DSC trace indicating two Tg values corresponding to immiscible domains of bisphenol-A homopolymer. Comparative Examples 11-14 all have both high haze and two distinct Tg's by DSC corresponding to the high Tg PPPBP-PC copolymer (Tg>180° C.) and a Tg of less than 160° C. corresponding to the BPA-PC homopolymer. For the 50:50 blends (weight ratio) the demarcation of miscible to immiscible occurs at a PPPBP level of about 36 mol % PPPBP-PC, with transparency achieved for blends having less than 36 mol % of PPPBP-PC. Any variation present in the Mw of the PPPBP-BPA copolycarbonate, within the ranges of composition and molecular weights for the compositions shown in Table 11, do not appear to have any significant effect on the Tg or haze observed.

Examples 51-55 and Comparative Example 16

Blends of 33 mol % PPPBP-PC copolymer (CPC-1) and BPA-PC homopolymer (HPC-6) were prepared, and the glass transition temperature determined, to note the relationship of PPPBP level and Tg, whether linear or non-linear. The data were determined using blends prepared by single screw extrusion as described above. The compositions and data are provided in Table 12, below.

TABLE 12

| Example | CPC-6: PPPBP copolymer (33 mole %), wt % | Hi Flow PC, wt % | Tg, °C. | Average Mw (g/mol) |
|---------|---|---|---|---|
| Ex. 51 | 99.6 | 0.0 | 196.2 | 23,592 |
| Ex. 52 | 79.6 | 20.0 | 183.6 | 22,936 |
| Ex. 53 | 59.6 | 40.0 | 172 | 22,634 |
| Ex. 54 | 39.6 | 60.0 | 162.5 | 22,422 |
| Ex. 55 | 19.6 | 80.0 | 149.1 | 21,711 |
| CEx. 16 | 0.0 | 99.6 | 141 | 20,992 |

Figure 5:
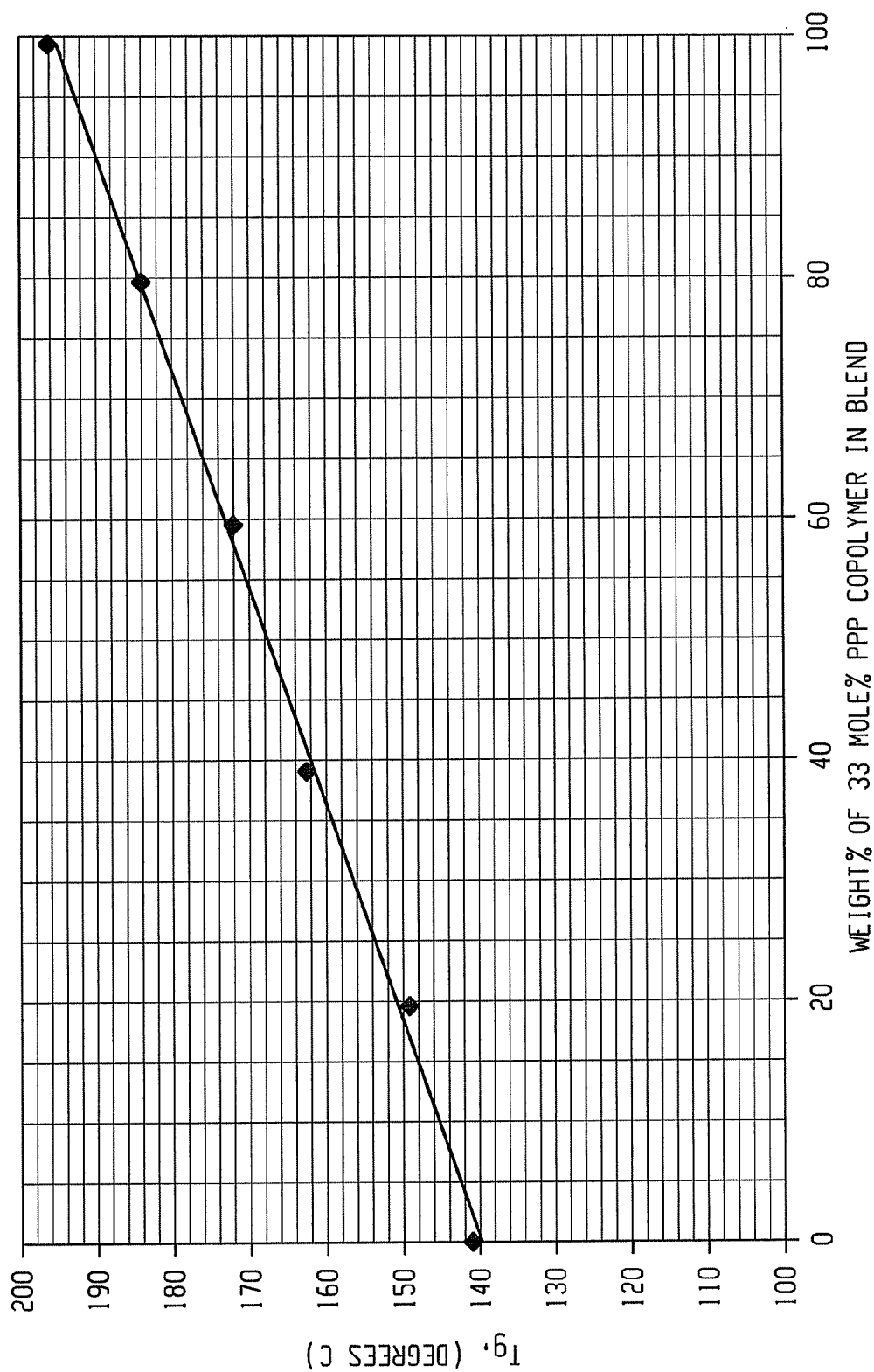
FIG. 5 is a plot of glass transition temperature (Tg) versus mole percent of structural units derived from 2-phenyl-3,3-bis(4-hydroxyphenyl)phthalimidine (PPPBP), for blends of 33 mol % PPPBP-PC copolycarbonates (Mw 23,592 g/mol) with bisphenol A homopolycarbonate (Mw 20,992 g/mol).

As seen in the data in Table 12, the correlation of glass transition temperature to PPPBP content of the blend of copolymer (CPC-6) and homopolymer (HPC-6) increases linearly with increasing PPPBP content. All data is for miscible blends. The linear correlation of Tg vs. mol % of PPPBP in the composition (for a blend of CPC-6 and HPC-6) for Exs. 51 to 55 and CEx. 16 can be clearly seen in the data as plotted in FIG. 5.

The singular forms "a," "an," and "the" include plural referents unless the context clearly dictates otherwise. The suffix "(s)" as used herein is intended to include both the singular and the plural of the term that it modifies, thereby including at least one of that term (for example, the colorant(s) includes at least one colorants). "Optional" or "optionally" means that the subsequently described event or circumstance can or cannot occur, and that the description includes instances where the event occurs and instances where it does not. The endpoints of all ranges directed to the same component or property are inclusive of the endpoint and independently combinable. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like.

The term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "cycloalkyl" refers to a non-aromatic monovalent monocyclic or multicyclic hydrocarbon group having at least three carbon atoms; "cycloalkylene" refers to a non-aromatic divalent monocyclic or multicyclic hydrocarbon group having at least three carbon atoms; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

An "organic group" as used herein means a saturated or unsaturated (including aromatic) hydrocarbon having a total of the indicated number of carbon atoms and that can be unsubstitited or unsubstitited with one or more of halogen, nitrogen, sulfur, or oxygen, provided that such substituents do not significantly adversely affect the desired properties of the composition, for example transparency, heat resistance, or the like. When a group or compound is "substituted or unsubstituted", the moiety optionally contains one or more exemplary substituents including $C_{1-12}$ alkyl, $C_{1-12}$ alkenyl, $C_{1-12}$ alkynyl, $C_{3-12}$ cycloalkyl, $C_{6-18}$ aryl, $C_{7-12}$ alkylaryl, $C_{7-18}$ arylalkyl, —$NO_2$, SH, —CN, OH, halogen, $C_{1-12}$ alkoxy, $C_{1-12}$ aryloxy, $C_{1-12}$ acyl, $C_{1-12}$ alkoxy carbonyl, and $C_{1-12}$ amide groups.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A thermoplastic composition comprising a polymer blend comprising:
   a first polycarbonate comprising a first structural unit derived from a dihydroxy aromatic compound having the formula (10):

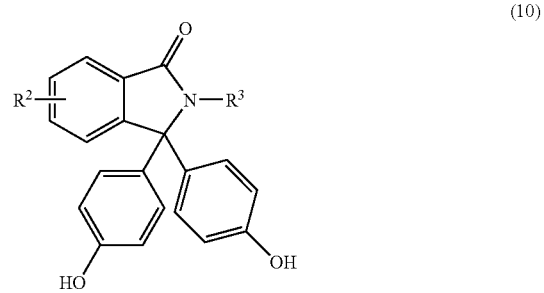

wherein $R^3$ is an aryl group having 6 to 25 carbon atoms, and $R^2$ is selected from the group consisting of a hydrogen, a $C_{1-25}$ hydrocarbyl group, and a halogen, and
   a second structural unit derived from a dihydroxy aromatic compound, where the second structural unit is not identical to the first structural unit, wherein the first polycarbonate has a weight averaged molecular weight of less than 32,000 g/mol as measured according to gel permeation chromatography calibrated to polycarbonate standards, and a second polycarbonate, different than the first polycarbonate, derived from dihydroxy aromatic compounds not identical to formula (10);

an acid additive, and an epoxy additive;

wherein the polymer blend has a glass transition temperature of 155 to 200° C.;

wherein the first polycarbonate has greater than 25 and less than 35 mol % of the first structural unit, based on the total moles of first and second structural units in the first polycarbonate, and the first polycarbonate is present in the blend in an amount of 10 to 90 wt % based on the total weight of the first polycarbonate and the second polycarbonate; and wherein a test article having a thickness of 3.2 mm and molded from the blend has a haze of less than or equal to 2.6% measured in accordance with ASTM D1003-00.

2. The thermoplastic composition of claim 1, wherein the acid additive has a pKa of less than or equal to 4.5.

3. The thermoplastic composition of claim 2, wherein the acid additive is p-toluenesulfonic acid.

4. The thermoplastic composition of claim 1, wherein the acid additive is present in an amount of up to 50 ppm by weight based on the weight of the polymer blend.

5. The thermoplastic composition of claim 4, wherein the acid additive is present in an amount of 0.1 to 20 ppm by weight based on the weight of the polymer blend.

6. The thermoplastic composition of claim 2, wherein the acid additive is phosphorous acid.

7. The thermoplastic composition of claim 1, wherein the epoxy additive is a styrene-acrylate-epoxy polymer, or an epoxy carboxylate oligomer or polymer, or a combination of a styrene-acrylate-epoxy polymer, or an epoxy carboxylate oligomer or polymer.

8. The thermoplastic composition of claim 7, wherein the epoxy additive is present in an amount of 0.001 to 1.0 wt %, based on the weight of polymer blend.

9. The thermoplastic composition of claim 1, wherein a molded article having a thickness of 3.2 millimeters and consisting of the polymer blend, acid additive, and epoxy additive has a yellowness index (YI) of less than or equal to 10 measured according to ASTM D1925-70.

10. The thermoplastic composition of claim 9, wherein a molded article having a thickness of 3.2 millimeters and consisting of the polymer blend, acid additive, and epoxy additive has a yellowness index (YI) of less than or equal to 5 measured according to ASTM D1925-70.

11. The thermoplastic composition of claim 1, wherein a molded article having a thickness of 3.2 millimeters and comprising the thermoplastic composition exhibits a reduction in weight averaged molecular weight (Mw) for the component polycarbonates of less than or equal to 12%, on exposure to combined heat and moisture conditions of 80° C. and 80% relative humidity for 1 week.

12. A transparent thermoplastic composition comprising a polymer blend comprising:

a polycarbonate comprising a first structural unit derived from a dihydroxy aromatic compound having the formula (10):

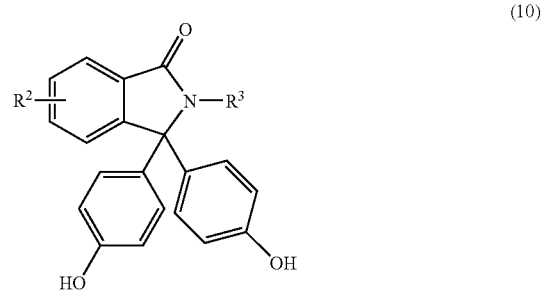

wherein $R^3$ is an aryl group having 6 to 25 carbon atoms, and $R^2$ is selected from the group consisting of a hydrogen, a $C_{1-25}$ hydrocarbyl group, and a halogen, and a second structural unit derived from a dihydroxy aromatic compound, and the second structural unit is not identical to the first structural unit; wherein the polycarbonate has greater than 25 and less than 35 mol % of the first structural unit, based on the total moles of first and second structural units in the polycarbonate;

an acid additive wherein the acid additive has a pKa of less than or equal to 4.5, and an epoxy additive wherein the epoxy additive is a styrene-acrylate-epoxy polymer, or a combination of a styrene-acrylate-epoxy polymer and an epoxy carboxylate oligomer or polymer;

wherein the polymer blend has a glass transition temperature of 155 to 200° C., and wherein a molded article having a thickness of 3.2 millimeters and comprising the thermoplastic composition exhibits a reduction in weight averaged molecular weight (Mw) for the component polycarbonates of less than or equal to 12%, on exposure to combined heat and moisture conditions of 80° C. and 80% relative humidity for 1 week.

13. The composition of claim 12, wherein the first polycarbonate is an interfacial polymerized polycarbonate.

* * * * *